(12) United States Patent
Sugaya

(10) Patent No.: US 12,160,530 B2
(45) Date of Patent: Dec. 3, 2024

(54) COMMUNICATION TERMINAL, SENSING DEVICE, AND SERVER

(71) Applicant: SONY CORPORATION, Tokyo (JP)

(72) Inventor: Shigeru Sugaya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 794 days.

(21) Appl. No.: 17/049,416

(22) PCT Filed: Feb. 15, 2019

(86) PCT No.: PCT/JP2019/005538
§ 371 (c)(1),
(2) Date: Oct. 21, 2020

(87) PCT Pub. No.: WO2019/215982
PCT Pub. Date: Nov. 14, 2019

(65) Prior Publication Data
US 2021/0258175 A1 Aug. 19, 2021

(30) Foreign Application Priority Data

May 7, 2018 (JP) .................................. 2018-089090

(51) Int. Cl.
*H04L 9/36* (2006.01)
*G08C 17/02* (2006.01)
(Continued)

(52) U.S. Cl.
CPC ................ *H04L 9/36* (2013.01); *G08C 17/02* (2013.01); *G16Y 10/40* (2020.01); *G16Y 20/10* (2020.01); *H04W 4/38* (2018.02)

(58) Field of Classification Search
CPC ........... H04L 9/36; G08C 17/02; G08C 15/00; G08C 17/00; G16Y 10/40; G16Y 20/10; H04W 4/38
See application file for complete search history.

(56) References Cited

U.S. PATENT DOCUMENTS

2006/0176842 A1 8/2006 Tamura
2012/0105201 A1* 5/2012 Sanders ................. G05B 15/02
340/5.83
(Continued)

FOREIGN PATENT DOCUMENTS

CN 1783823 A 6/2006
CN 101137038 A 3/2008
(Continued)

OTHER PUBLICATIONS

International Search Report and Written Opinion of PCT Application No. PCT/JP2019/005538, issued on Mar. 19, 2019, 09 pages of ISRWO.

*Primary Examiner* — Amie C. Lin
(74) *Attorney, Agent, or Firm* — CHIP LAW GROUP

(57) ABSTRACT

Among information regarding a sensing device (IoT device), only particular content (attribute information) is disclosed. A communication terminal includes a packet-signal reception unit, an attribute-information extraction unit, and an attribute-information transmission unit. The packet-signal reception unit receives a packet signal transmitted from a sensing device around the communication terminal. The attribute-information extraction unit extracts attribute information on the sensing device from the packet signal transmitted from the sensing device around the communication terminal. The attribute-information transmission unit transmits the attribute information that has been extracted to a server.

10 Claims, 17 Drawing Sheets

(51) Int. Cl.
*G16Y 10/40* (2020.01)
*G16Y 20/10* (2020.01)
*H04W 4/38* (2018.01)

(56) References Cited

U.S. PATENT DOCUMENTS

| | | | | |
|---|---|---|---|---|
| 2014/0344269 | A1* | 11/2014 | Dong | H04L 67/12 |
| | | | | 707/802 |
| 2015/0180934 | A1* | 6/2015 | Richter | G05B 19/102 |
| | | | | 709/217 |
| 2015/0254463 | A1* | 9/2015 | Ryhorchuk | H04L 9/3247 |
| | | | | 713/176 |
| 2018/0108246 | A1* | 4/2018 | Garg | G08B 25/009 |
| 2018/0218607 | A1* | 8/2018 | Baghel | G08G 1/162 |
| 2019/0172262 | A1* | 6/2019 | McHugh | G06F 3/011 |
| 2021/0075858 | A1* | 3/2021 | Naito | G06Q 50/10 |

FOREIGN PATENT DOCUMENTS

| | | |
|---|---|---|
| CN | 101163228 A | 4/2008 |
| CN | 201135495 Y | 10/2008 |
| CN | 101594589 A | 12/2009 |
| CN | 201860384 U | 6/2011 |
| CN | 102214395 A | 10/2011 |
| CN | 102833224 A | 12/2012 |
| CN | 103987034 A | 8/2014 |
| CN | 105430061 A | 3/2016 |
| CN | 106031631 A | 10/2016 |
| JP | 2002-108945 A | 4/2002 |
| JP | 2002-142276 A | 5/2002 |
| JP | 2006-165695 A | 6/2006 |
| JP | 2011-053931 A | 3/2011 |
| JP | 2015-106349 A | 6/2015 |
| JP | 2016-024822 A | 2/2016 |

* cited by examiner

FIG. 10

| 681 | 682 | 683 | 684 | 685 | 686 | | | | | | | 687 |
|---|---|---|---|---|---|---|---|---|---|---|---|---|
| SYNCHRONIZING SIGNAL | TRANSMISSION DESTINATION DEVICE UNIQUE INFORMATION | TRANSMITTER SERVER UNIQUE INFORMATION | TARGET POSITION INFORMATION | NUMBER (N) OF NOTIFIED SURROUNDING IoT DEVICES | DEVICE INFORMATION-1 | | | ... | DEVICE INFORMATION-N | | | ERROR DETECTION CODE |
| | | | | | NOTIFICATION INFORMATION | ARRANGEMENT POSITION | OPERATION STATE | | NOTIFICATION INFORMATION | ARRANGEMENT POSITION | OPERATION STATE | |
| | | | | | 691 | 692 | 693 | | | | | |

FIG. 11

| 601 | 602 | 603 | 604 | 605 | 606 | 607 |
|---|---|---|---|---|---|---|
| COLLECTION DATE AND TIME | DEVICE INFORMATION | SENSOR INFORMATION | INSTALLATION POSITION | RECEIVED STRENGTH | COLLECTION SCOPE | OPERATION STATE |
| yy. mm. dd. time | aaaaaaaa | bbbbbbbb | xx. yy. z/aa. bb. c | mmm | ccc × ddd | eeeeee |
| yy. mm. dd. time | ffffffff | gggggggg | xx. yy. z/aa. bb. c | kkk | xyz × abc | hhhhhh |
| yy. mm. dd. time | jjjjjjjj | kkkkkkkk | xx. yy. z/aa. bb. c | jjj | ccc × ddd | mmmmmm |
| : | : | : | : | : | : | : |

COMMUNICATION TERMINAL, SENSING DEVICE, AND SERVER

CROSS REFERENCE TO RELATED APPLICATIONS

This application is a U.S. National Phase of International Patent Application No. PCT/JP2019/005538 filed on Feb. 15, 2019, which claims priority benefit of Japanese Patent Application No. JP 2018-089090 filed in the Japan Patent Office on May 7, 2018. Each of the above-referenced applications is hereby incorporated herein by reference in its entirety.

TECHNICAL FIELD

The present technology relates to a sensing device. Specifically, the present technology relates to a server and a communication terminal that are for displaying information regarding the sensing device.

BACKGROUND ART

In recent years, internet of things (IoT) technology has been becoming popular. The IoT technology includes installing a plurality of sensing devices that is IoT devices that include sensors that collect environmental data, and thus using a plurality of environmental data through the Internet. Specifically, the following technology is used to collect information on used amounts of electricity, gas, water, and the like. The technology includes wirelessly transmitting data from meters, storing the data in a data center, and collecting information as data on a used amount at each home and each office in real time. As to an environmental-information collection system that uses IoT devices that include these conventional sensors, the IoT devices are installed for a particular purpose by gaining an approval from, for example, a manager who manages the installation place. Therefore, if an installer who installs the sensors agrees with the manager who manages the installation place, the IoT devices installed at the installation place collect environmental data as the installer pleases. Therefore, for example, surveillance cameras installed to collect image information, such as a surveillance camera, collect images of a plurality of people who passes in front of the cameras. Moreover, the image information is configured to collect personal information from a plurality of people who passes in front of the cameras, but an approval is not gained from each of the plurality of people. On the other hand, in a case where a crime occurs, these surveillance cameras supply information that is effective in determining the criminal.

As described above, environmental data is collected irrespective of will of a plurality of general users who passes a place where the sensing devices are installed. In a case where surveillance cameras are installed at a public place open to a plurality of people, personal information on people who pass in front of the cameras is collected without notice even if a crime or the like does not occur. A date and time at which a particular person passes in front of the surveillance cameras, and a person with whom a particular person passes in front of the surveillance cameras are particularly apparent. There is much possibility that a privacy of a person is infringed on. Furthermore, if information of these surveillance cameras circulates against an intention of the installer, there is a possibility that the information is abused for an act that infringes on a privacy, depending on an interest of a person who has gained the information.

Information regarding such a sensing device has been used for surveillance and collection by a manager. For example, a system that visually displays values measured by sensors on a map is proposed (see Patent Document 1, for example).

CITATION LIST

Patent Document

Patent Document 1: Japanese Patent Application Laid-Open No. 2016-024822

SUMMARY OF THE INVENTION

Problems to be Solved by the Invention

The above conventional technology displays values measured by sensors. Such disclosure of all information causes security or privacy problems, as described above. Therefore, the following technology needs to be provided. In a case where IoT devices that collect information exist in the space, the technology allows existence of the IoT devices, attributes of the IoT devices, environmental data collected by the IoT devices to be fairly disclosed to people who exist in the space.

The present technology is generated considering such a situation. It is an object of the present technology to disclose only particular content among information regarding a sensing device.

Solutions to Problems

The present technology is made to solve the above problems. A first aspect of the present technology is a communication terminal including: a packet-signal reception unit that receives a packet signal transmitted from a sensing device around the communication terminal; an attribute-information extraction unit that extracts attribute information on the sensing device from the packet signal; and an attribute-information transmission unit that transmits the attribute information to a server. Therefore, an effect by which the attribute information on the sensing device around the communication terminal is accumulated in the server is obtained.

Furthermore, in the first aspect, the packet signal may include a public area and a private area, and the public area may include the attribute information. Therefore, an effect by which the attribute information is disclosed with the packet signal is obtained.

Furthermore, in the first aspect, the attribute information may include at least any of information regarding a type of a sensor of the sensing device, information regarding an arrangement position of the sensing device, or information regarding an operation state of the sensing device.

Furthermore, the first aspect may further include a position-information obtaining unit that obtains position information on the communication terminal, and the attribute-information transmission unit may transmit the attribute information to the server on the basis of the position information that has been obtained. Therefore, an effect by which the attribute information is accumulated in the server on the basis of the position information on the communication terminal is obtained.

Furthermore, a second aspect of the present technology is a communication terminal including: an attribute-information-obtaining request unit that requests a server to obtain attribute information on a sensing device arranged around the communication terminal; and an attribute-information reception unit that receives the attribute information on the sensing device transmitted from the server. Therefore, an effect by which the server supplies the attribute information on the sensing device arranged around the communication terminal is obtained.

Furthermore, the second aspect may further include a movement-destination inference unit that infers a movement destination of the communication terminal, and the attribute-information-obtaining request unit may request the server to obtain the attribute information on the sensing device arranged around the movement destination that has been inferred. Therefore, an effect by which the server supplies the attribute information on the sensing device arranged around the movement destination that has been inferred is obtained.

Furthermore, the second aspect may further include a display unit that displays information regarding the sensing device on a map on the basis of the attribute information received from the server. Therefore, an effect by which the information regarding the sensing device arranged around the communication terminal is displayed on the map is obtained.

Furthermore, a third aspect of the present technology is a sensing device including: a measurement unit that measures a surrounding environment and generates a measurement result; a packet-signal generation unit that generates a packet signal that includes a public area that includes attribute information on the sensing device, and a private area that includes the measurement result; and a packet-signal transmission unit that transmits, at a predetermined period, the packet signal that has been generated. Therefore, an effect by which the attribute information on the sensing device is disclosed, and the measurement result is supplied to a particular address is obtained.

Furthermore, in the third aspect, the packet-signal generation unit may encrypt the private area. Therefore, an effect by which the measurement result is encrypted is obtained.

Furthermore, a fourth aspect of the present technology is a server including: a storage unit that stores attribute information that includes information regarding an arrangement position of a sensing device; an obtaining-request reception unit that receives, from a communication terminal, an obtaining request that is requested to obtain the attribute information; and an attribute-information transmission unit that transmits, on the basis of position information on the communication terminal included in the obtaining request, the attribute information on the sensing device arranged around the communication terminal among the attribute information stored in the storage unit. Therefore, an effect by which the attribute information on the sensing device is accumulated, and the attribute information around the communication terminal is supplied in response to the obtaining request of the communication terminal is obtained.

Furthermore, the fourth aspect may further include an attribute-information reception unit that receives the attribute information on the sensing device from the communication terminal, and makes the storage unit store the attribute information. Therefore, an effect by which the attribute information on the sensing device transmitted from the communication terminal is accumulated is obtained.

Furthermore, the fourth aspect may further include an arrangement position inference unit that extracts a strength of a received electric field received at the communication terminal from the attribute information received from the communication terminal, infers an arrangement position of the sensing device on the basis of the strength of the received electric field, and makes the storage unit store the attribute information to which the arrangement position that has been inferred is added. Therefore, an effect by which the arrangement position of the sensing device is inferred on the basis of the strength of the received electric field received at the communication terminal is obtained.

Furthermore, the fourth aspect may further include a measurement-result proposal unit that proposes supply of a result of measurement of a surrounding environment measured by the sensing device, on the basis of the position information on the communication terminal included in the obtaining request. Therefore, an effect by which the supply of a result of measurement measured by the sensing device is proposed on the basis of the position information on the communication terminal is obtained.

Effects of the Invention

The present technology may have an excellent effect by which only particular content among information regarding a sensing device is disclosed. Note that effects described here are not necessarily limitative, but may be any effect described in the present disclosure.

BRIEF DESCRIPTION OF DRAWINGS

FIG. 10 is a diagram that illustrates a configuration example of a transmission frame of the information server 500 in the exemplary embodiment of the present technology.

FIG. 11 is a diagram that illustrates a configuration example of a database of the information server 500 in the exemplary embodiment of the present technology.

MODE FOR CARRYING OUT THE INVENTION

Hereinafter, an exemplary embodiment for carrying out the present technology (hereinafter referred to as the exemplary embodiment) will be described. The description is performed in the following order.
1. Summary of Processes (Collection and Supply of Information Regarding IoT Devices)
2. Configuration (IoT Device, Mobile Terminal, and Information Server)
3. Information (Attribute Information and Sensed Data)
4. Operations (Process Procedures)
5. Application Examples 1. Summary of Processes

[Collection of Information Regarding IoT Devices]

Figure 1:
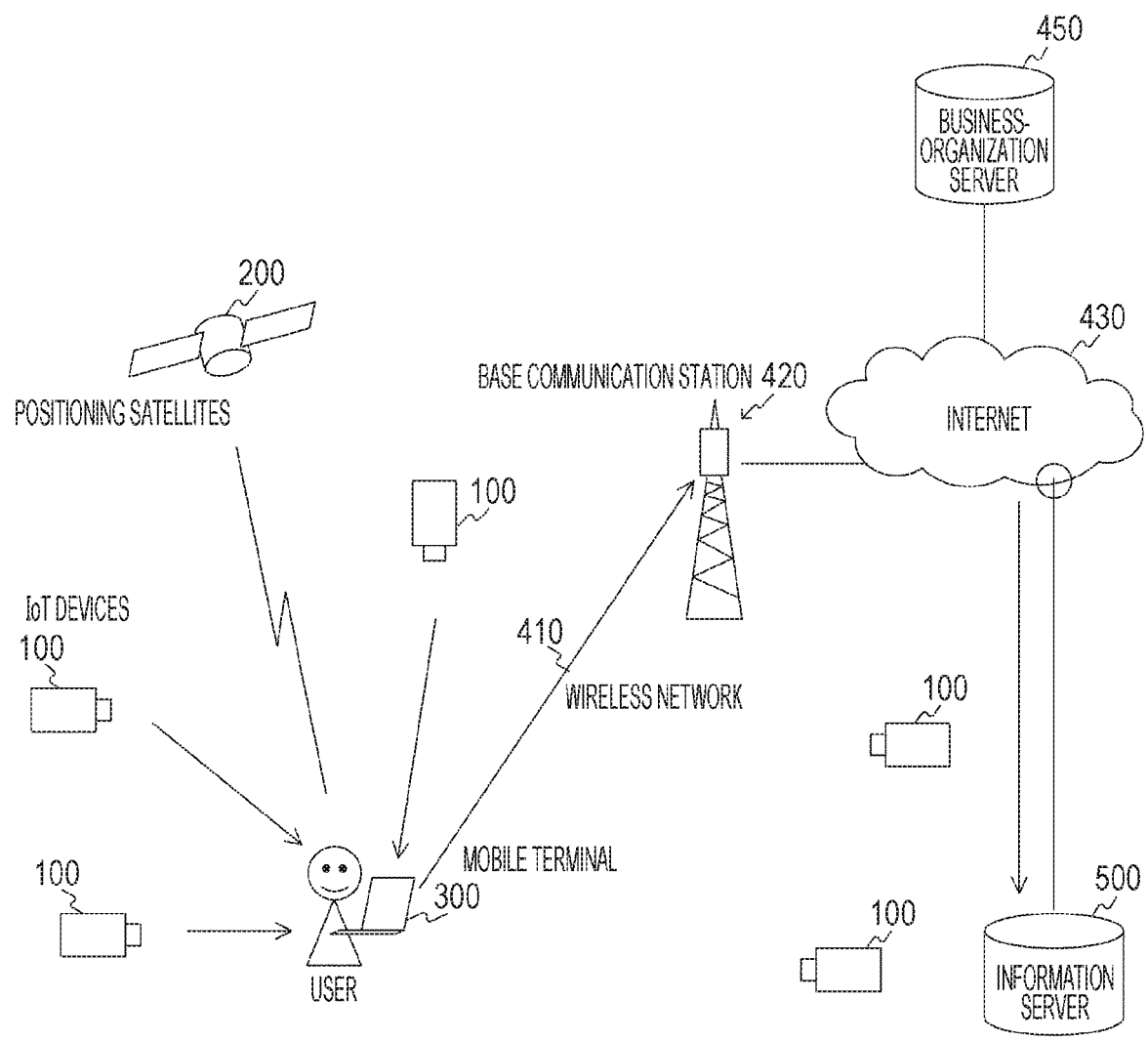
FIG. 1 is a diagram that schematically illustrates a first process of collecting information regarding internet of things (IoT) devices 100 in an exemplary embodiment of the present technology.

FIG. 1 is a diagram that schematically illustrates a first process of collecting information regarding internet of things (IoT) devices 100 in the exemplary embodiment of the present technology.

The information processing system includes the IoT devices 100 that are arranged at various positions, a mobile terminal 300, a business-organization server 450, and an information server 500. In the first process, the mobile terminal 300 of a user collects information transmitted from the various IoT devices 100 that exist around the mobile terminal 300, and transmits the information.

The IoT devices 100 are sensing devices that have functions of measuring a surrounding environment. The IoT devices 100 obtain sensed data. The sensed data includes the surrounding environment, images captured by a video camera or the like, and the like. The surrounding environment includes, for example, values, such as a temperature, humidity, and the like. Furthermore, the IoT devices 100 transmit the sensed data obtained as described above to the outside. At this time, the IoT devices 100 transmit attribute information on the IoT devices 100 in addition to the sensed data.

As described later, the sensed data is encrypted, and thus an unauthorized third party cannot know content of the sensed data. On the other hand, the attribute information is intended to be disclosed, and is not encrypted.

The mobile terminal 300 is a terminal used by a user. The mobile terminal 300 may be, for example, a mobile phone, such as a smart phone, a tablet terminal, or the like. The mobile terminal 300 is an example of a communication terminal recited in the claims. Furthermore, the mobile terminal 300 is configured to collect position information from positioning satellites 200, such as the global positioning system (GPS). Furthermore, the mobile terminal 300 is configured to receive information (sensed data and attribute information) transmitted from surrounding IoT devices 100. Further, the mobile terminal 300 is configured to perform communication through a wireless network 410, a base communication station 420, and the Internet 430. Note that in a case where information from an IoT device 100 does not include an arrangement position, the mobile terminal 300 may also notify of information on a strength of a received electric field (signal strength) at a time when the mobile terminal 300 receives the signal. Therefore, an arrangement position is inferred.

The business-organization server 450 is a server of a business organization that runs a business that uses the sensed data. The business-organization server 450 receives information (sensed data and attribute information) transmitted from the IoT devices 100 through the mobile terminal 300. The business-organization server 450 makes the information server 500 store the attribute information transmitted from the IoT devices 100. Furthermore, the business-organization server 450 may propose supply of the sensed data, as described later. In this case, the business-organization server 450 is one example of a measurement-result proposal unit recited in the claims.

The information server 500 is a server that stores the attribute information on the IoT devices 100. To grasp installation states and operation states of the IoT devices 100, the information server 500 builds a database on the IoT devices 100 connected with position information.

In the first process, different mobile terminals 300 collect information from signals from the same IoT device 100, and statistics on the information are accumulated in the database of the information server 500. According to the database in which the statistics have been accumulated as described above, arrangement positions of the IoT devices 100 are inferred.

Figure 2:
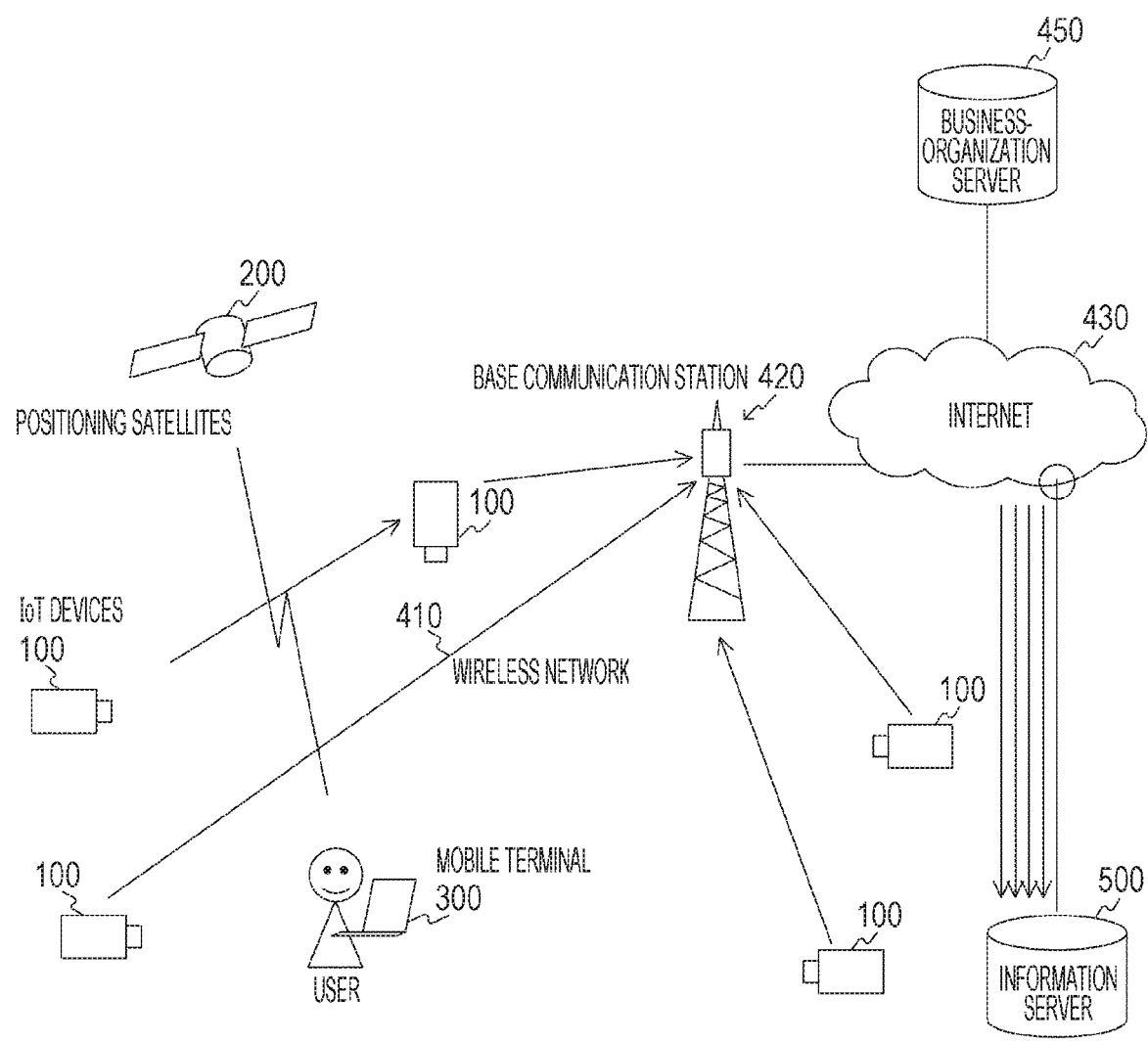
FIG. 2 is a diagram that schematically illustrates a second process of collecting information regarding the IoT devices 100 in the exemplary embodiment of the present technology.

FIG. 2 is a diagram that schematically illustrates a second process of collecting information regarding the IoT devices 100 in the exemplary embodiment of the present technology.

In the second process, information transmitted from each of the IoT devices 100 is collected by the business-organization server 450 not through the mobile terminal 300. That is, the business-organization server 450 analyzes information transmitted from each of the IoT devices 100 when the business-organization server 450 receives the information, and collects attribute information on the IoT device 100 contained in the data. The attribute information includes an installation position, types of collected data, information on operation time, and the like. Then, the attribute information is stored in the information server 500, similarly as the above first process.

[Supply of Information Regarding IoT Devices]

Figure 3:
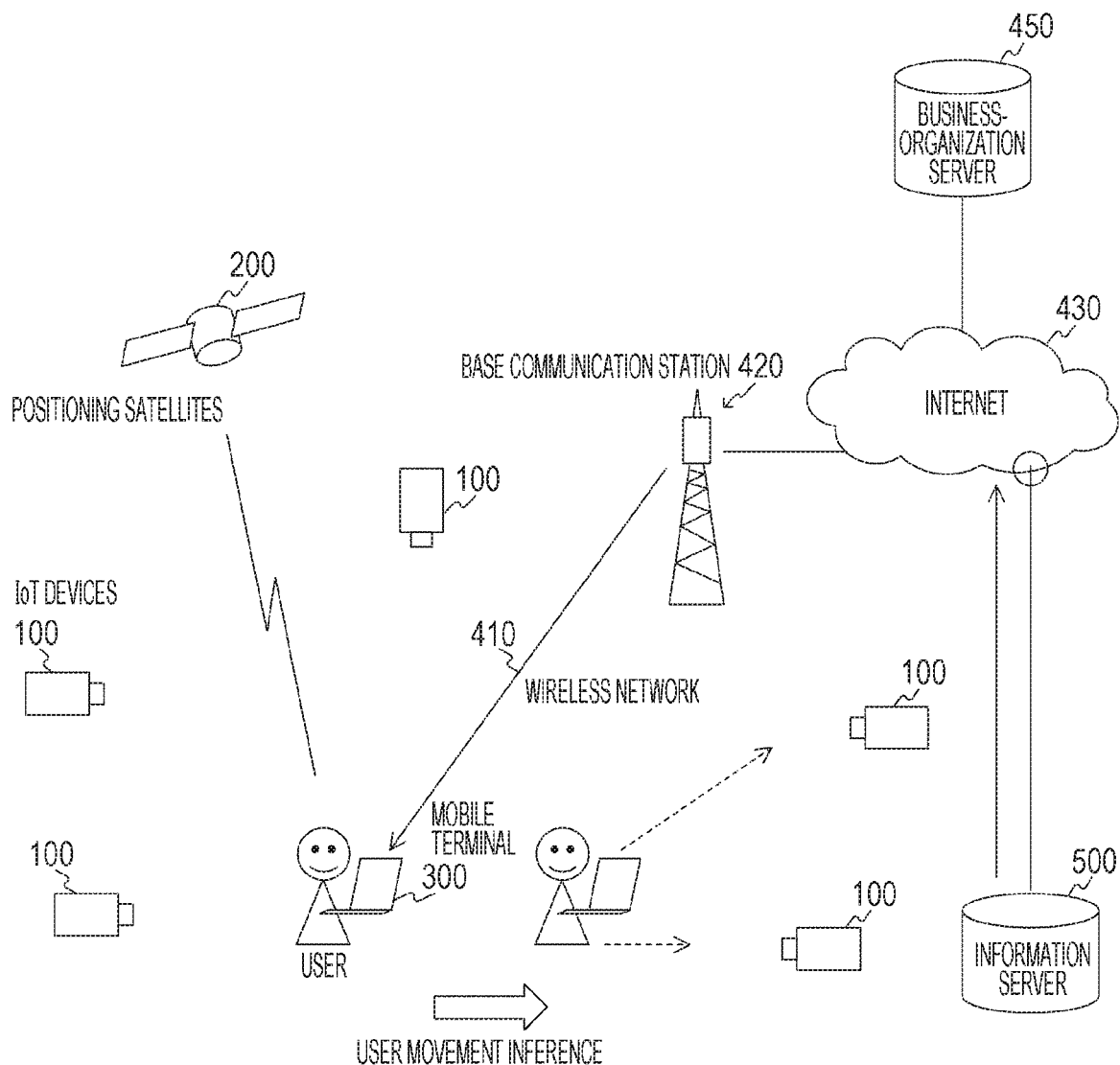
FIG. 3 is a diagram that schematically illustrates a process of supplying information regarding the IoT devices 100 in the exemplary embodiment of the present technology.

FIG. 3 is a diagram that schematically illustrates a process of supplying information regarding the IoT devices 100 in the exemplary embodiment of the present technology.

In this example, the information server 500 supplies the mobile terminal 300 with information regarding surrounding IoT devices 100. The information server 500 supplies information selected from information accumulated in the database on the basis of position information received from the mobile terminal 300. At that time, after the mobile terminal 300 not only infers a current position but also infers a movement destination, the mobile terminal 300 may request the server to obtain information on IoT devices 100 arranged around the inferred movement destination. The information server 500 may infer the movement destination on the basis of GPS information on the mobile terminal 300, and the like.

In connection with the position information on a position that has been inferred as described above, the mobile terminal 300 may request disclosure of information that indicates IoT devices 100 that exist around the position that has been inferred, and the types of collected data and information. That is, the mobile terminal 300 accesses the database of the information server 500. The database extracts attribute information on IoT devices 100 that exist in the area or in the direction, from the movement inference information on the mobile terminal 300. The database supplies the extracted attribute information to the mobile terminal 300.

Therefore, the mobile terminal 300 can grasp each of IoT devices 100 that exist around an area where the user has moved.

2. Configuration

[Configuration of Mobile Terminal]

Figure 4:
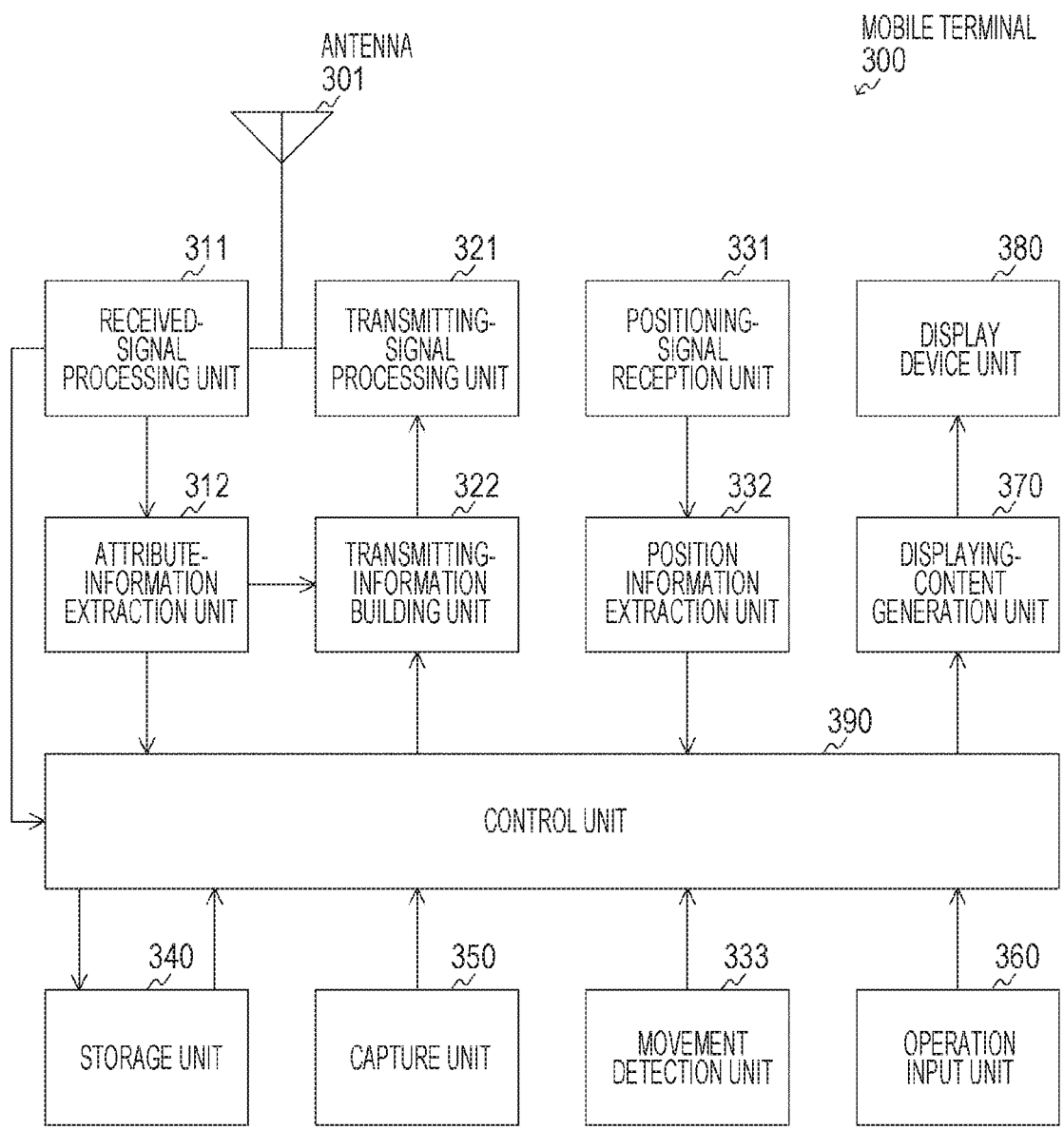
FIG. 4 is a diagram that illustrates a configuration example of a mobile terminal 300 in the exemplary embodiment of the present technology.

FIG. 4 is a diagram that illustrates a configuration example of the mobile terminal 300 in the exemplary embodiment of the present technology.

The mobile terminal 300 has a function of being operated by a user to search for surrounding IoT devices 100, uploading a result of the search to the information server 500, and obtaining, from a data server, information on IoT devices 100 that exist around a movement destination. The mobile terminal 300 includes an antenna 301, a received-signal processing unit 311, an attribute-information extraction unit 312, a transmitting-signal processing unit 321, a transmitting-information building unit 322, a positioning-signal reception unit 331, and a position information extraction unit 332. Furthermore, the mobile terminal 300 includes a storage unit 340, a movement detection unit 333, a capture unit 350, an operation input unit 360, a displaying-content generation unit 370, a display device unit 380, and a control unit 390.

The antenna 301 is an antenna that receives information from surrounding IoT devices 100, and transmits information. The received-signal processing unit 311 processes received signals.

The attribute-information extraction unit 312 extracts attribute information on IoT device (s) 100 from a signal received by the received-signal processing unit 311. Note that the received-signal processing unit 311 is one example of a packet-signal reception unit or an attribute-information reception unit that are recited in the claims.

The transmitting-information building unit 322 builds information for uploading, to the information server 500, collected attribute information on IoT devices 100. The transmitting-signal processing unit 321 uploads information to the information server 500 through the wireless network 410, the base communication station 420, and the Internet 430. Note that the transmitting-signal processing unit 321 is one example of an attribute-information transmission unit recited in the claims.

The positioning-signal reception unit 331 receives signals from the positioning satellites 200, such as the GPS, to obtain position information on the mobile terminal 300. The position information extraction unit 332 extracts position information on the mobile terminal 300 from signals received by the positioning-signal reception unit 331. Note that the position information extraction unit 332 is one example of a position-information obtaining unit recited in the claims.

The movement detection unit 333 detects a movement state and an orientation of the mobile terminal 300 to grasp a movement state and an orientation of the user. Here, the movement state is detected to infer a future movement position. An inferred position depends on, for example, movement on vehicle, walking, or the like. Since the movement detection unit 333 grasps the movement state, the position is accurately inferred. Moreover, since the movement detection unit 333 includes a magnetic sensor or the like, the movement detection unit 333 measures an orientation in which the movement detection unit 333 faces. Note that the movement detection unit 333 is one example of a movement-destination inference unit recited in the claims.

The storage unit 340 is memory that stores programs and data that are necessary for operations of the mobile terminal 300. The storage unit 340 stores, for example, collected attribute information on IoT devices 100.

The capture unit 350 includes a camera that captures surrounding things, a microphone that receives information on surrounding sounds, and the like.

The operation input unit 360 is a user interface that receives instructions input by the user. The displaying-content generation unit 370 generates content displayed to the user. The display device unit 380 is a device that displays the content that has been generated by the displaying-content generation unit 370 on a screen. Note that the display device unit 380 is one example of a display unit recited in the claims.

The control unit 390 controls a series of operations of each of the units of the mobile terminal 300. Furthermore, if the control unit 390 receives a request from the user through the operation input unit 360, and the request being requested to obtain information, the control unit 390 requests the information server 500 to obtain attribute information on IoT devices 100 arranged around the mobile terminal 300. Note that the control unit 390 is one example of an attribute-information-obtaining request unit recited in the claims.

[Configuration of IoT Device]

Figure 5:
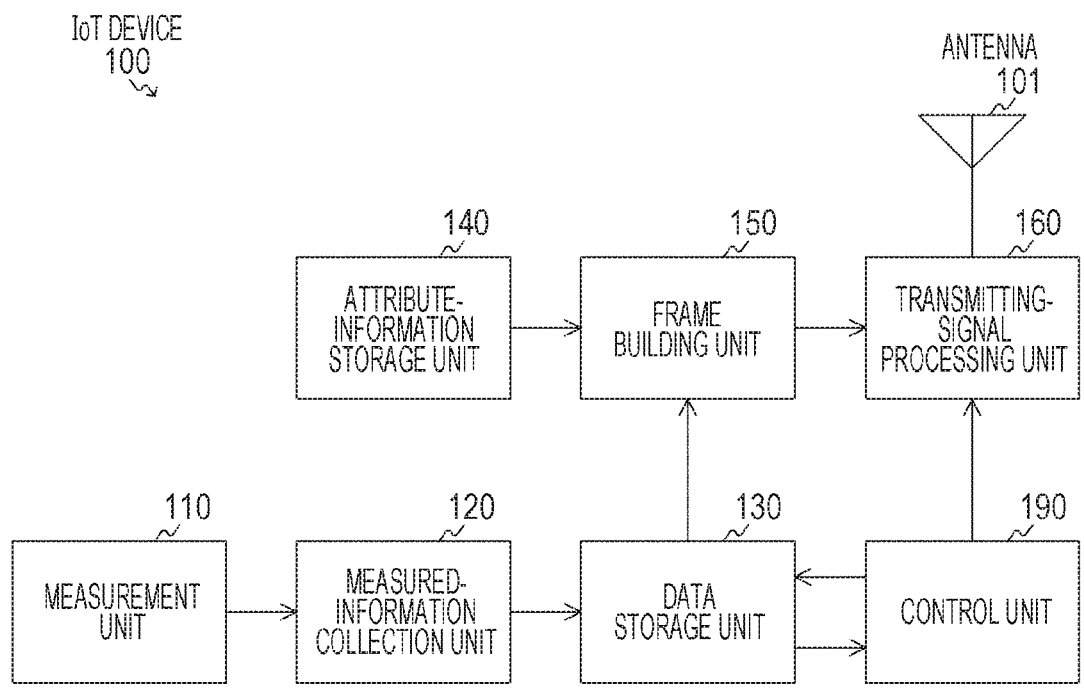
FIG. 5 is a diagram that illustrates a configuration example of the IoT device 100 in the exemplary embodiment of the present technology.

FIG. 5 is a diagram that illustrates a configuration example of the IoT device 100 in the exemplary embodiment of the present technology.

The IoT device 100 collects data on a surrounding environment, and transmits information in a predetermined frame format to the business-organization server 450, to the information server 500, and to the mobile terminal 300 through the wireless network 410, the base communication station 420, and the Internet 430. The IoT device 100 includes an antenna 101, a measurement unit 110, a measured-information collection unit 120, a data storage unit 130, an attribute-information storage unit 140, a frame building unit 150, a transmitting-signal processing unit 160, and a control unit 190.

The measurement unit 110 obtains measured data as various sensors, and obtains image information obtained from a camera and the like, for example. The measured-information collection unit 120 collects, obtains, and extracts the measured data, as information. At that time, statistics processes, such as an average of data, may be performed. The data storage unit 130 stores data that has been collected.

The attribute-information storage unit 140 stores attribute information on the IoT device 100. The frame building unit 150 builds a predetermined transmission frame from the attribute information stored in the attribute-information storage unit 140, and the measured data (sensed data) stored in the data storage unit 130. In the transmission frame, the sensed data is encrypted, and the attribute information is not encrypted. Note that the frame building unit 150 is one example of a packet-signal generation unit recited in the claims.

The transmitting-signal processing unit 160 wirelessly transmits frames built by the frame building unit 150 through the antenna 101 at predetermined timings. Note that the transmitting-signal processing unit 160 is one example of a packet-signal transmission unit recited in the claims.

The control unit 190 controls a series of operations of each of the units of the IoT device 100.

Configuration of Information Server

Figure 6:
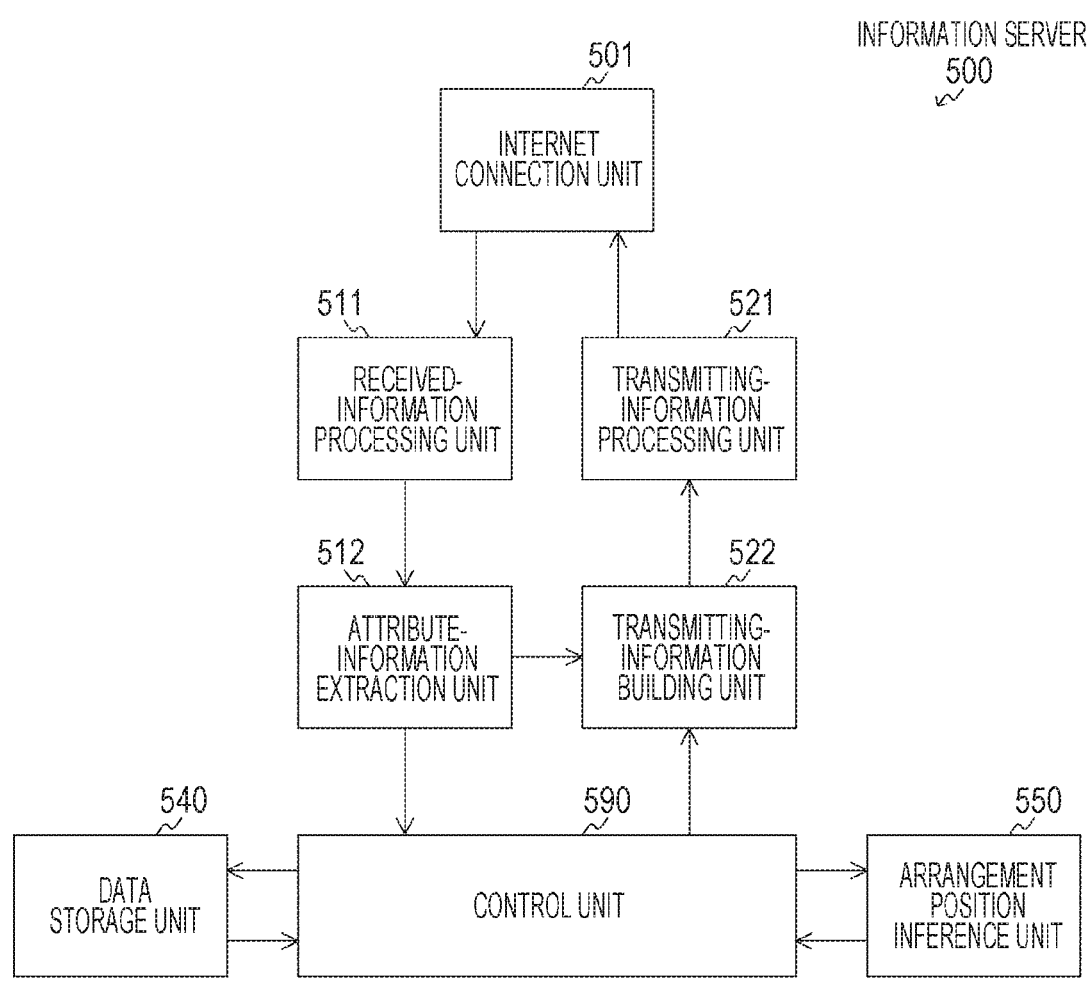
FIG. 6 is a diagram that illustrates a configuration example of an information server 500 in the exemplary embodiment of the present technology.
Figures 7A, 7B, 7C, 7D:
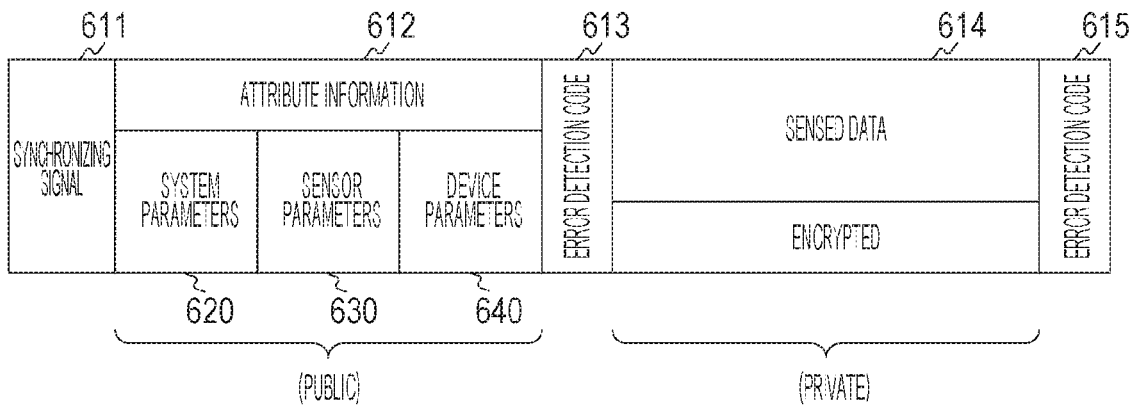
FIGS. 7A, 7B, 7C, and 7D are diagrams that illustrates a configuration example of a transmission frame of the IoT device 100 in the exemplary embodiment of the present technology.

FIG. 6 is a diagram that illustrates a configuration example of the information server 500 in the exemplary embodiment of the present technology.

The information server 500 alone manages attribute information on the IoT devices 100 collected by the mobile terminal 300 or directly collected by the business-organization server 450. That is, the information server 500 builds a database. In the database, collected attribute information on the IoT devices 100 is recorded as information connected with arrangement positions of the IoT devices 100. Furthermore, in a case where the mobile terminal 300 requests an arrangement state of IoT devices 100 in a desired position, attribute information on IoT devices 100 that exist around a predetermined position is notified of in response to the request.

The information server 500 includes an internet connection unit 501, a received-information processing unit 511, an attribute-information extraction unit 512, a transmitting-information processing unit 521, a transmitting-information building unit 522, a data storage unit 540, an arrangement position inference unit 550, and a control unit 590.

The internet connection unit 501 receives attribute information from the mobile terminal 300 and the IoT devices 100 through predetermined connection lines, through the Internet 430. Alternatively, the internet connection unit 501 supplies attribute information on IoT devices 100 to the mobile terminal 300.

The received-information processing unit 511 extracts necessary data and a necessary request from received information. The attribute-information extraction unit 512 extracts attribute information on IoT device (s) 100 that has been received. Note that the received-information processing unit 511 is one example of an obtaining-request reception unit or an attribute-information reception unit that are recited in the claims. Furthermore, the attribute-information extraction unit 512 is one example of an attribute-information extraction unit recited in the claims.

The transmitting-information building unit 522 builds information that will be transmitted to the mobile terminal 300. The transmitting-information processing unit 521 transmits information to the mobile terminal 300 through the Internet 430, the base communication station 420, and the wireless network 410. Note that the transmitting-information processing unit 521 is one example of an attribute-information transmission unit recited in the claims.

The data storage unit 540 stores attribute information on the IoT devices 100, as a database. Note that the data storage unit 540 is one example of a storage unit recited in the claims.

The arrangement position inference unit 550 infers arrangement positions of IoT devices 100 on the basis of data on the IoT devices 100 that has been received before.

The control unit 590 controls a series of operations of each of the units of the information server 500.

3. Information

[Configuration of Transmission Frame of IoT Device]

FIGS. 7A, 7B, 7C, and 7D are diagrams that illustrates a configuration example of a transmission frame of the IoT device 100 in the exemplary embodiment of the present technology.

The frame format is a frame structure wirelessly transmitted from the IoT device 100. A synchronizing signal 611 is followed by attribute information 612 on the IoT device 100, and sensed data 614. The attribute information 612 on the IoT device 100, and the sensed data 614 are separated from each other. A predetermined error detection code 613 is added to the attribute information 612. A predetermined error detection code 615 is added to the sensed data 614. Here, the attribute information 612 is configured in a format that allows the attribute information 612 to be disclosed to a third party (public area). On the other hand, the sensed data 614 that may cause security or privacy problems is encrypted to configure the sensed data 614 in a private format (private area).

The attribute information 612 is information that indicates attributes of the IoT device 100. The attribute information 612 includes at least one of, for example, system parameters 620, sensor parameters 630, or device parameters 640.

The system parameters 620 indicate information on the IoT device 100 as a system. The system parameters 620 include, for example, system unique information 621, country and region identification information 622, communications service provider information 623, transmission class information 624, installation business organization information 625, information collection business organization information 626, optional group information 627, and the like.

The sensor parameters 630 indicate information on the IoT device 100 as a sensor. The sensor parameters 630 include, for example, information 631 on the number of attached sensor (s), information 632 on the type (s) of the attached sensor (s), attached-sensor class information 633, sensor operation information 634, data collection frequency information 635, data transmission frequency information 636, information 637 on margin (s) of error(s) of the sensor (s), and the like. Note that the sensor operation information 634, the data collection frequency information 635, and the data transmission frequency information 636 are one example of an operation state recited in the claims.

The device parameters 640 indicate information on the IoT device 100 as a device. The device parameters 640 include device unique information 641, a device arrangement position 642, device altitude information 643, information 644 on a margin of an error of a measurement position, device life information 645, information 646 on device fixing, device movement information 647, and the like.

In the above first example, the mobile terminal 300 that has received the frame extracts the attribute information 612 that is not encrypted, and transmits the attribute information 612 to the information server 500. Alternatively, in the above second example, the business-organization server 450 that has received the frame extracts the attribute information 612, and transmits the attribute information 612 to the information server 500. Furthermore, in either example, the business-organization server 450 preliminarily has a cryptographic key, uses the cryptographic key to decode the sensed data 614, and uses the sensed data 614 later.

Note that the above parameters are only exemplified, and addition or deletion may be performed as necessary.

[Configuration of Transmission Frame of IoT Device]

Figure 8:
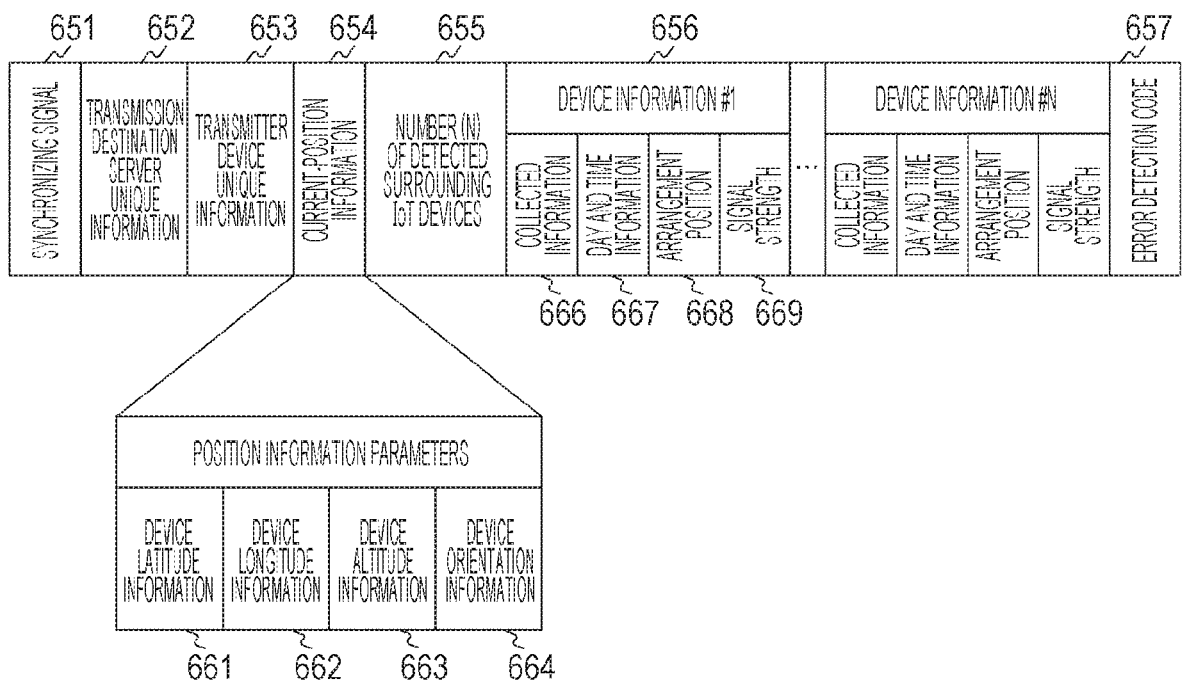
FIG. 8 is a diagram that illustrates a configuration example of a transmission frame of the mobile terminal 300 for information collection in the exemplary embodiment of the present technology.

FIG. 8 is a diagram that illustrates a configuration example of a transmission frame of the mobile terminal 300 for information collection in the exemplary embodiment of the present technology.

The frame format is a frame transmitted from the mobile terminal 300 to the information server 500 through the wireless network 410 and the Internet 430 to collect information regarding IoT devices 100. The transmission frame for information collection includes a synchronizing signal 651 followed by transmission destination server unique information 652, transmitter device unique information 653, current-position information 654, the number (N) 655 of detected surrounding IoT devices, and device information 656 on each of the N devices that are added to the synchronizing signal 651. Furthermore, an error detection code 657 is added to the end.

Here, position information parameters of the current-position information 654 include device latitude information 661, device longitude information 662, device altitude information 663, device orientation information 664, and the like.

Furthermore, the device information 656 on each of the devices includes collected information 666, collection day and time information 667, a collected arrangement position 668, a signal strength 669 of a received signal, and the like. The device information 656 on each of the N detected devices is connected together.

The information server 500 that has received the frame stores the device information 656 as attribute information on the IoT devices 100.

Note that the above parameters are only exemplified, and addition or deletion may be performed as necessary.

Figure 9:
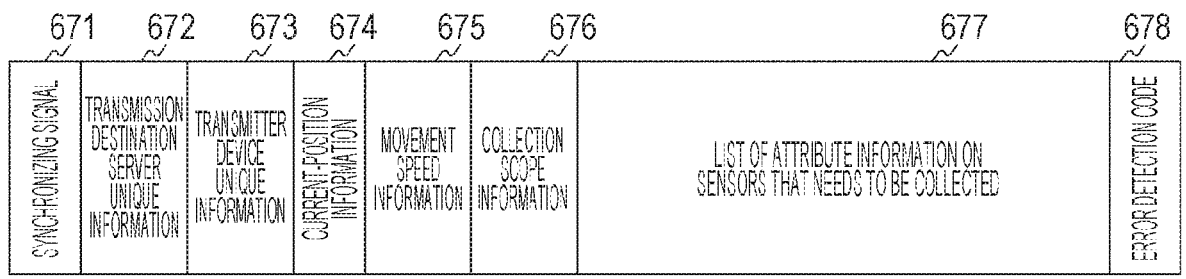
FIG. 9 is a diagram that illustrates a configuration example of a transmission frame of the mobile terminal 300 for request for information in the exemplary embodiment of the present technology.

FIG. 9 is a diagram that illustrates a configuration example of a transmission frame of the mobile terminal 300 for request for information in the exemplary embodiment of the present technology.

The frame format is a frame transmitted from the mobile terminal 300 to the information server 500 through the wireless network 410 and the Internet 430. The transmission frame for request for information includes a synchronizing signal 671 followed by transmission destination server unique information 672, transmitter device unique information 673, current-position information 674, movement speed information 675, collection scope information 676, and a list 677 of attribute information on sensors that needs to be collected. Furthermore, an error detection code 678 is added to the end.

The information server 500 that has received the frame supplies the mobile terminal 300 with attribute information on IoT devices 100 that correspond to the current-position information 674 or the collection scope information 676. At that time, the movement speed information 675 may also be considered. Furthermore, items of attribute information that correspond to the list 677 of attribute information on sensors that needs to be collected are supplied.

Note that the above parameters are only exemplified, and addition or deletion may be performed as necessary.

[Configuration of Transmission Frame of Information Server]

FIG. 10 is a diagram that illustrates a configuration example of a transmission frame of the information server 500 in the exemplary embodiment of the present technology.

The frame format is a frame transmitted from the information server 500 to the mobile terminal 300 through the wireless network 410 and the Internet 430 to supply information in response to a request of the mobile terminal 300. After a synchronizing signal 681, the transmission frame includes transmission destination device unique information 682, transmitter server unique information 683, target position information 684, the number (N) 685 of notified surrounding IoT devices, and device information 686 on each of the N devices. Furthermore, an error detection code 687 is added to an end of the transmission frame.

Furthermore, the device information 686 on each of the devices includes notification information 691, an arrangement position 692, an operation state 693 of the device, and the like. The device information 686 on each of the N notified devices is connected together.

The mobile terminal 300 that has received the frame obtains each of the device information 686, as attribute information on the IoT devices 100.

Note that the above parameters are only exemplified, and addition or deletion may be performed as necessary.

[Database Configuration of Information Server]

FIG. 11 is a diagram that illustrates a configuration example of the database of the information server 500 in the exemplary embodiment of the present technology.

As described above, the information server 500 collects attribute information on the IoT devices 100 and accumulates the attribute information on the IoT devices 100 as a database. Here, an example of format in which parameters that include the collected attribute information on the IoT devices 100 are stored is illustrated.

As the storage format, parameters that include collection date and time 601, device information 602, sensor information 603, installation position 604, received strength 605, collection scope 606, operation state 607, and the like are stored.

The information server 500 accumulates the device information 602, the sensor information 603, and the like, on the basis of the collected information 666 on the IoT devices 100. The accumulated information is transmitted as notification information 691 on the IoT devices 100 in response to a request of the mobile terminal 300.

Note that the above parameters are only exemplified, and addition or deletion may be performed as necessary.

That is, these databases are referred to as necessary, and updated as necessary.

4. Operations

[Overall Operations Between Apparatuses]

Figure 12:
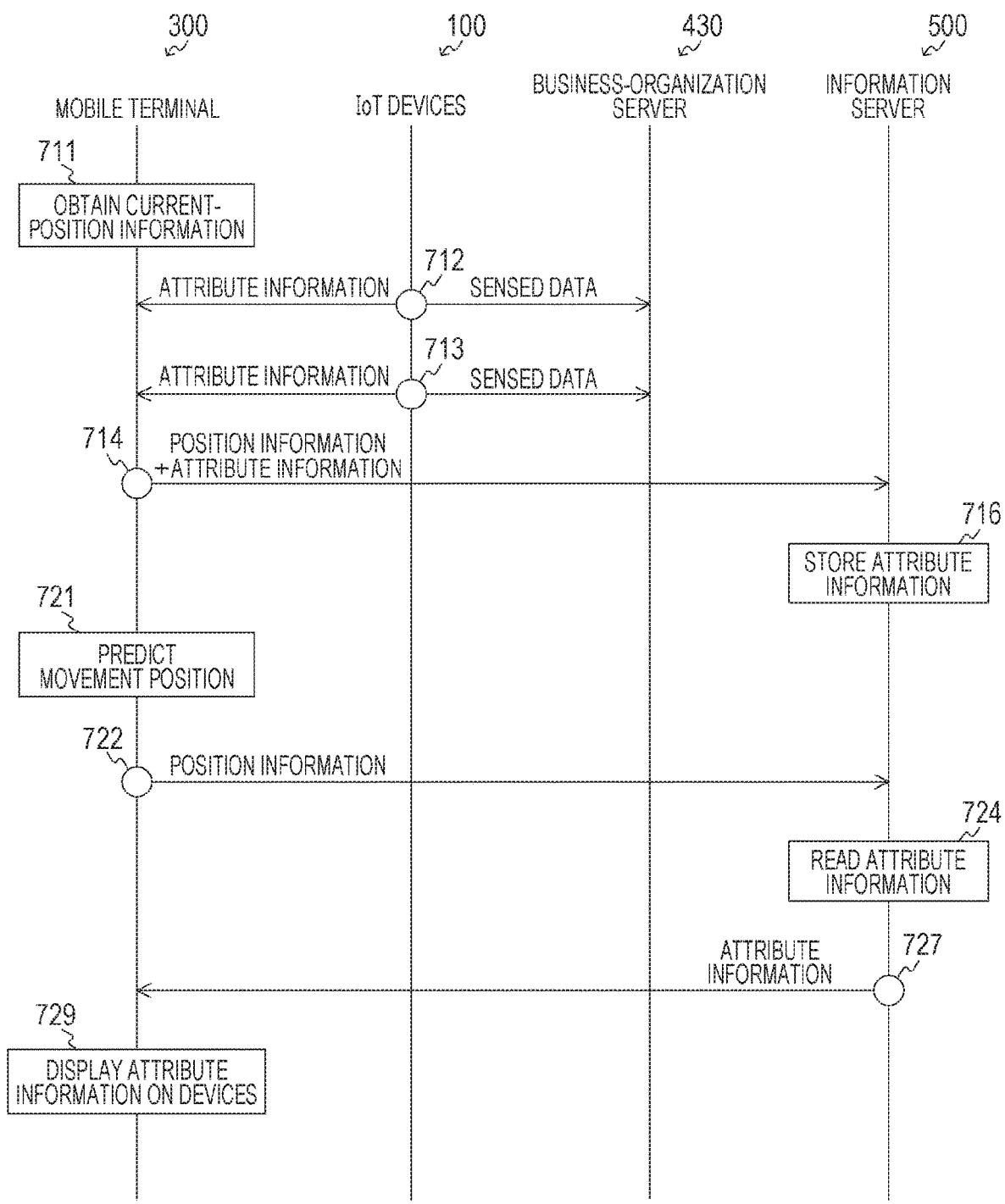
FIG. 12 is a sequence diagram that illustrates a first example of collection and supply of information regarding the IoT devices 100 in an information processing system according to the exemplary embodiment of the present technology.

FIG. 12 is a sequence diagram that illustrates a first example of collection and supply of information regarding the IoT devices 100 in the information processing system according to the exemplary embodiment of the present technology. Suppose that in the first example, attribute information on the IoT devices 100 is collected through the mobile terminal 300.

The mobile terminal 300 uses the positioning satellites 200 to obtain current-position information on the mobile terminal 300 (711). The IoT devices 100 measure a surrounding environment with measurement units 110, and transmit the sensed data and attribute information, as frames, at predetermined frequencies (712, 713). The mobile terminal 300 obtains the attribute information from the frames. Furthermore, the business-organization server 450 obtains the sensed data from the frames.

The mobile terminal 300 transmits the position information on the mobile terminal 300 and the attribute information on the IoT devices 100 (714). The information server 500 stores the attribute information that has been received in the database (716). At this time, arrangement positions and operation states of the IoT devices 100 may be more accurately grasped using a statistical method, on the basis of attribute information on the IoT devices 100 and position information that are collected from a plurality of mobile terminals 300.

Thereafter, the mobile terminal 300 predicts a movement position of the mobile terminal 300 as necessary (721). Then, the mobile terminal 300 requests supply of attribute information on IoT devices 100 around the predicted position information (722). In response to the request of the mobile terminal 300, the information server 500 reads attribute information on the IoT devices 100 from the database (724), and transmits the attribute information (727).

The mobile terminal 300 that has received the attribute information on the IoT devices 100 from the information server 500 displays the attribute information (729).

Figure 13:
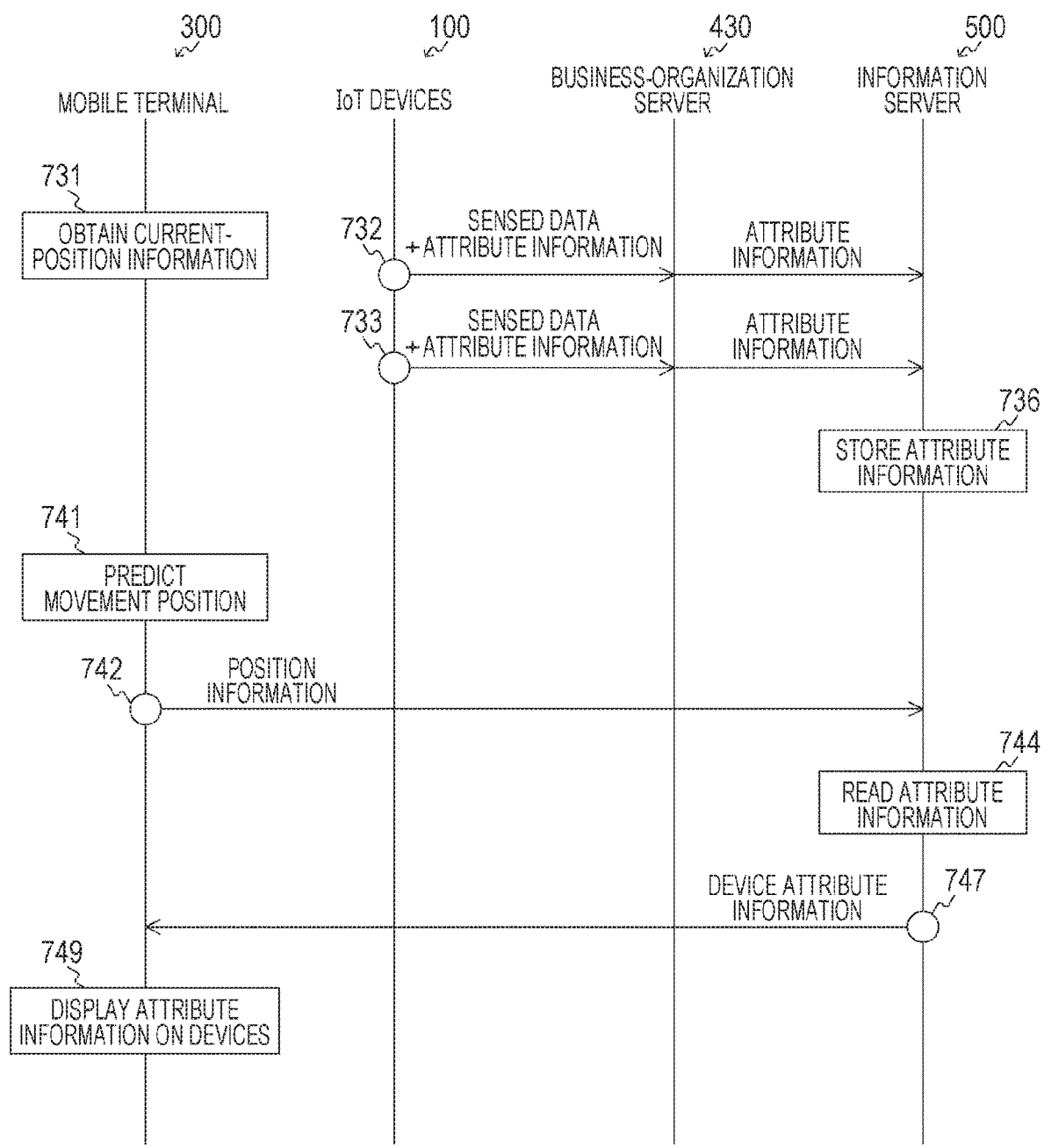
FIG. 13 is a sequence diagram that illustrates a second example of collection and supply of information regarding the IoT devices 100 in the information processing system according to the exemplary embodiment of the present technology.

FIG. 13 is a sequence diagram that illustrates a second example of collection and supply of information regarding the IoT devices 100 in the information processing system according to the exemplary embodiment of the present technology. Suppose that in the second example, attribute information on the IoT devices 100 is collected through the business-organization server 450.

The mobile terminal 300 uses the positioning satellites 200 to obtain current-position information on the mobile terminal 300 (731). The IoT devices 100 measure a surrounding environment with measurement units 110, and transmit the sensed data and attribute information, as frames, at predetermined frequencies (732, 733).

The business-organization server 450 obtains the attribute information and the sensed data from the frames transmitted from the IoT devices 100. Then, the business-organization server 450 transmits the attribute information to the information server 500. The attribute information is among the information obtained from the IoT devices 100. The information server 500 stores the attribute information that has been received in the database (736). Also in this case, arrangement positions and operation states of the IoT devices 100 may be more accurately grasped using a statistical method, on the basis of the attribute information on the IoT devices 100 collected from the business-organization server 450.

The process of supplying information after 736 (741 to 749) is similar to the above first example (721 to 729).

[Operations of Mobile Terminal]

Figure 14:
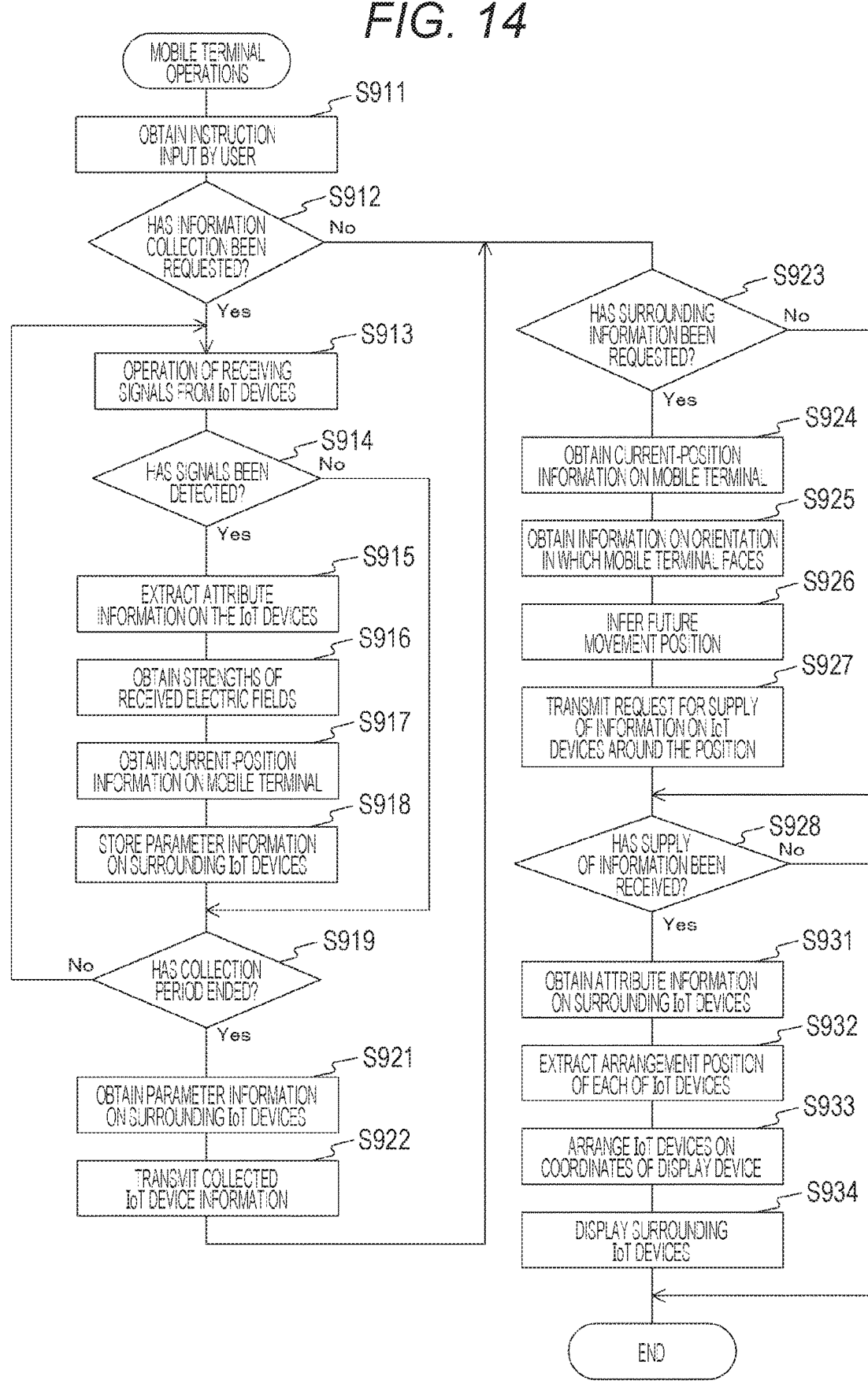
FIG. 14 is a flowchart that illustrates a process procedure example of the mobile terminal 300 in the exemplary embodiment of the present technology.

FIG. 14 is a flowchart that illustrates a process procedure example of the mobile terminal 300 in the exemplary embodiment of the present technology.

The mobile terminal 300 receives input from a user through the operation input unit 360 (step S911). If input from a user is a request for collection of information regarding IoT devices 100 (step S912: Yes), the process in and after step S913 is performed. Alternatively, if input from a user is not a request for collection of information regarding IoT devices 100 (step S912: No), the process in and after step S923 is performed.

If information collection has been requested (step S912: Yes), the mobile terminal 300 performs an operation of receiving signals from IoT devices 100 (step S913). Then, if signals has been detected (step S914: Yes), the following process is performed. That is, first, attribute information on IoT devices 100 that have transmitted the signals is extracted (step S915). Furthermore, strengths of received electric fields at that time are obtained (step S916). A current-position information on the mobile terminal 300 is also obtained (step S917). The attribute information on the IoT devices 100, the strengths of received electric fields at that time, and the current-position information on the mobile terminal 300 are stored as parameters of surrounding IoT devices 100 (step S918). The process from steps S913 to S918 is repeated until a period of the information collection ends (step S919: No). If the period of the information collection has ended (step S919: Yes), all parameters of surrounding IoT devices 100 are obtained (step S921). Collected information on the IoT devices 100 is converted into a predetermined frame format, and is transmitted to the information server 500 (step S922).

In a case where input from a user is a request for supply of information regarding IoT devices 100 (step S923: Yes), the mobile terminal 300 performs a process of requesting supply of information on IoT devices 100 according to a procedure described below. That is, current-position information on the mobile terminal 300 is obtained (step S924). Information on an orientation in which the mobile terminal 300 faces is obtained (step S925). A future movement position is inferred (step S926). Then, a frame that requests supply of information on IoT devices 100 around the position is transmitted to the information server 500 (step S927).

Then, if supply of information on the IoT devices 100 has been received from the information server 500 (step S928; Yes), the mobile terminal 300 performs a process of displaying the information on the IoT devices 100 according to a procedure described below. That is, attribute information on surrounding IoT devices 100 is obtained (step S931). An arrangement position of each of the IoT devices 100 is extracted (step S932). Then, the IoT devices 100 are arranged on coordinates of the display device unit 380 on the basis of the arrangement positions of the IoT devices 100 (step S933). The IoT devices 100 around the mobile terminal 300 are displayed (step S934).

[Operations of IoT Device]

Figure 15:
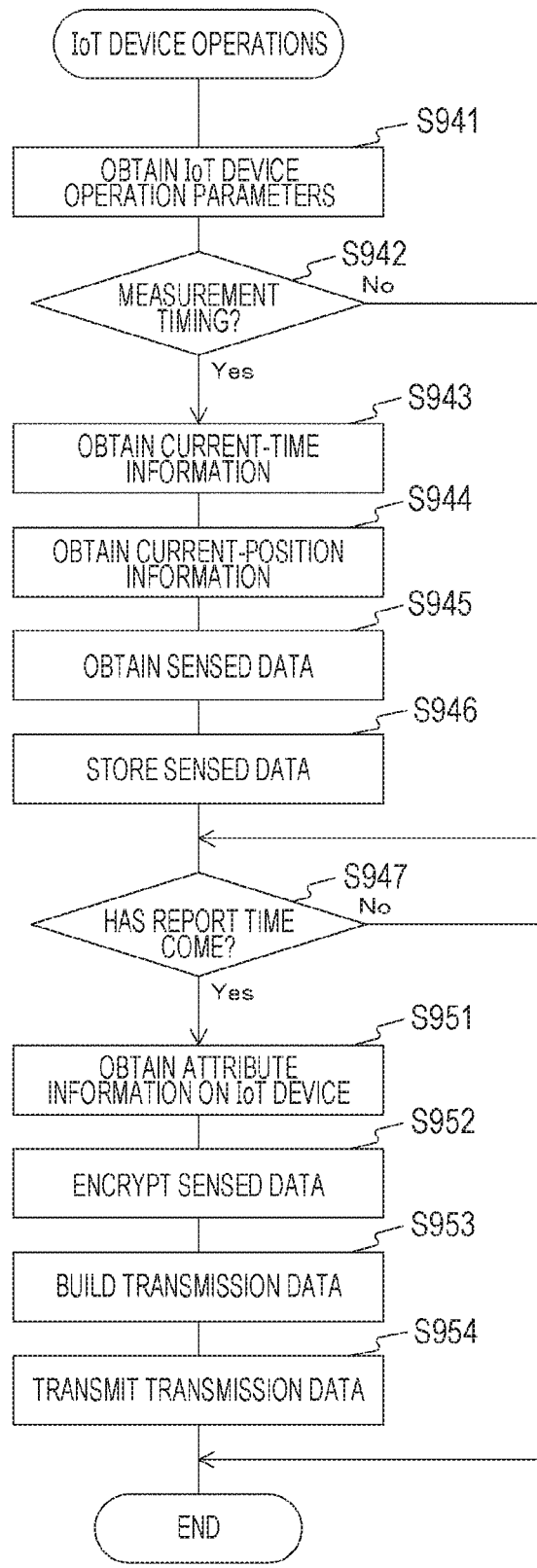
FIG. 15 is a flowchart that illustrates a process procedure example of the IoT device 100 in the exemplary embodiment of the present technology.

FIG. 15 is a flowchart that illustrates a process procedure example of the IoT device 100 in the exemplary embodiment of the present technology.

First, the IoT device 100 obtains parameters to operate as the IoT device 100 (step S941). Then, when a measurement timing for sensing comes (step S942: Yes), current-time information is obtained as necessary (step S943), a current arrangement position is obtained (step S944), and data sensed with a measurement unit 110 is obtained (step S945). Then, data that includes the measured data that has been sensed, and attribute information that includes the obtained parameters described above and the like is stored (step S946). The measurement is performed when every measurement timing comes.

Next, when a time for a report timing has come (step S947: Yes), the attribute information on the IoT device 100 is obtained (step S951). The portion is written in a format that allows the portion to be disclosed to a third party. Moreover, the sensed data is obtained. The portion is encrypted not to allow the portion to be disclosed to a third party (step S952). The attribute information and the sensed data are built as one transmission frame (step S953). Then, the transmission frame is transmitted as data for predetermined users through the base communication station 420 and the Internet 430 (step S954).

[Operations of Information Server]

Figure 16:
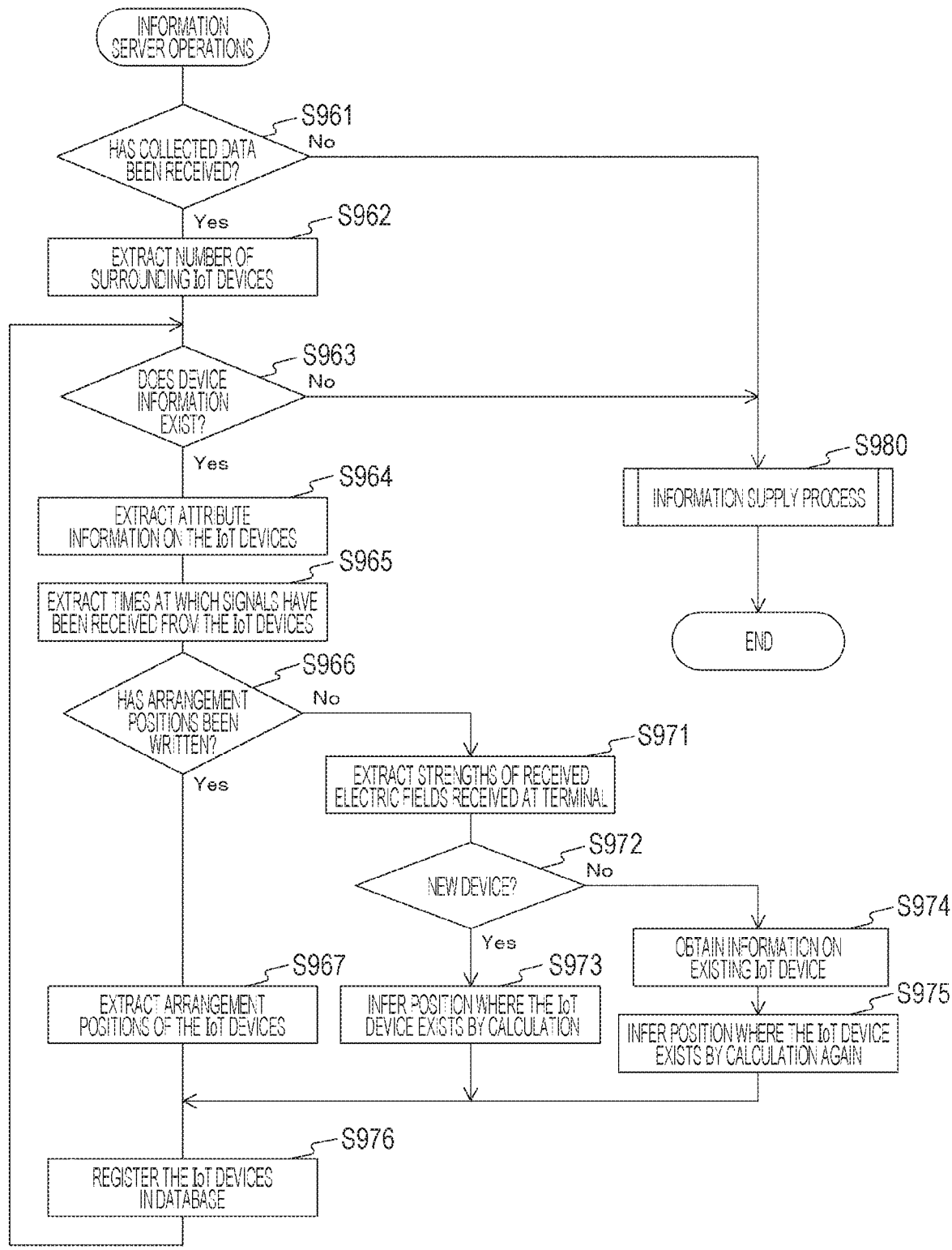
FIG. 16 is a flowchart that illustrates a process procedure example of the information server 500 in the exemplary embodiment of the present technology.

FIG. 16 is a flowchart that illustrates a process procedure example of the information server 500 in the exemplary embodiment of the present technology.

First, if the information server 500 has received collected data on IoT devices 100 from the mobile terminal 300 (step S961: Yes), the information server 500 extracts the number of surrounding IoT devices 100 written in the collected data (step S962). Then, in a case where device information exists (step S963: Yes), the following registration process in and after step S964 is performed.

That is, attribute information and the like on the IoT devices 100 are extracted (step S964). Information on times at which signals have been received from the IoT devices 100 is extracted (step S965).

Here, if arrangement positions of the IoT devices 100 have been written (step S966: Yes), the arrangement positions of the IoT devices 100 are extracted (step S967), and parameters of the IoT devices 100 are registered in the database (step S976).

On the other hand, if arrangement positions are not written (step S966: No), information on strengths of received electric fields received at the mobile terminal 300 is extracted (step S971). Then, if a new IoT device 100 exists (step S972: Yes), a position where the IoT device 100 exists is inferred by calculation (step S973). Parameters of these IoT devices 100 are registered in the database (step S976).

If a new IoT device 100 does not exist (step S972: No), information on an existing IoT device 100 that has been registered in the database is obtained (step S974). Then, a position where the IoT device 100 exists is inferred by calculation again (step S975). Parameters of these IoT devices 100 are registered in the database (step S976).

These processes are repeated. If the number of IoT devices 100 that have been registered in the database becomes equal to the extracted number of surrounding IoT devices 100, the registration process is ended.

In this way, the information server 500 is configured to build a database on the basis of information from the mobile terminal 300.

Figure 17:
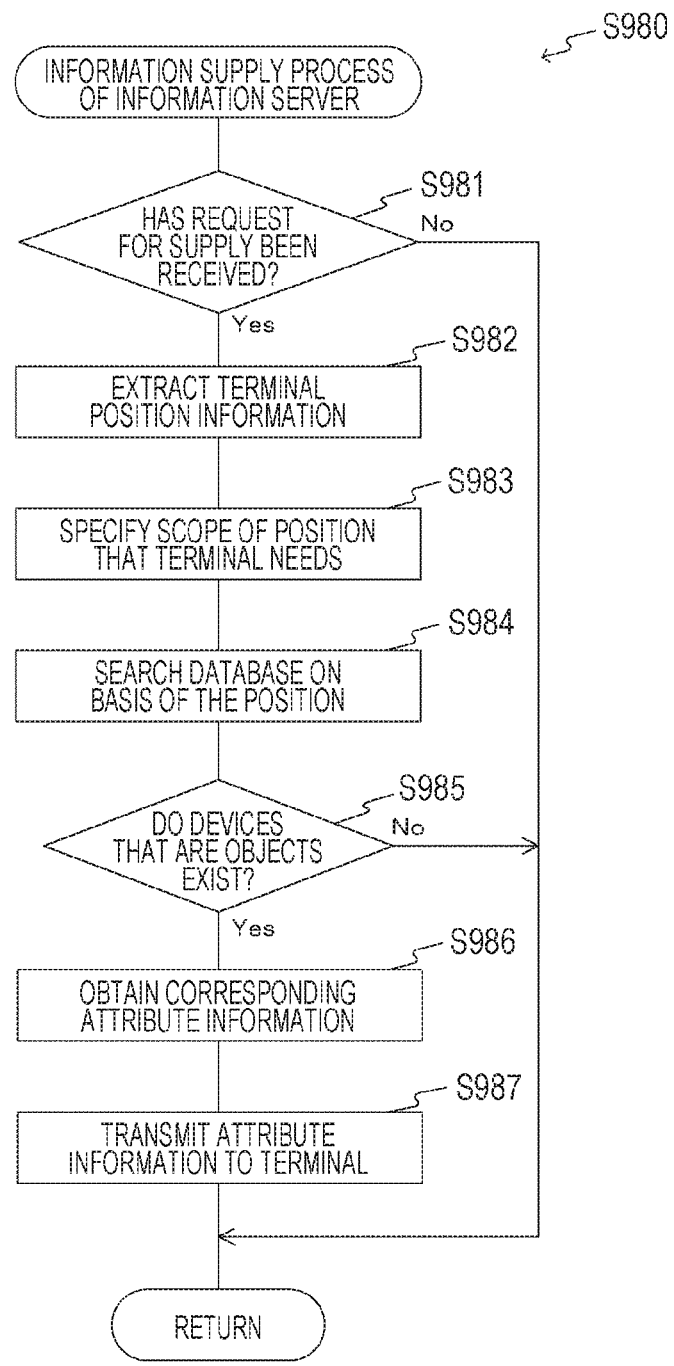
FIG. 17 is a flowchart that illustrates a process procedure example of an information supply process of the information server 500 in the exemplary embodiment of the present technology.

FIG. 17 is a flowchart that illustrates a process procedure example of an information supply process (step S980) of the information server 500 in the exemplary embodiment of the present technology.

In a case where a request for supply of information on IoT devices 100 has been received from the mobile terminal 300 (step S981: Yes), the following information supply process is performed. That is, position information on the mobile terminal 300 is extracted (step S982). A scope of a position that the mobile terminal 300 needs is specified (step S983). The database of the information server 500 is searched on the basis of the position (step S984). In a case where existing IoT devices 100 that are objects exist (step S985: Yes), attribute information on the corresponding IoT devices 100 is obtained (step S986). Then, parameters of the IoT devices 100 in which all of these are written are transmitted as the attribute information to the mobile terminal 300 (step S987).

Furthermore, in a case where the information server 500 obtains, from the base communication station 420 and the Internet 430, attribute information that includes arrangement positions of IoT devices 100, as described in the above second example, the information may be registered in the database. Then, on the basis of the database, attribute information may be appropriately supplied in response to a request of the mobile terminal 300.

5. Application Examples

[Display on Map]

Figure 18A:
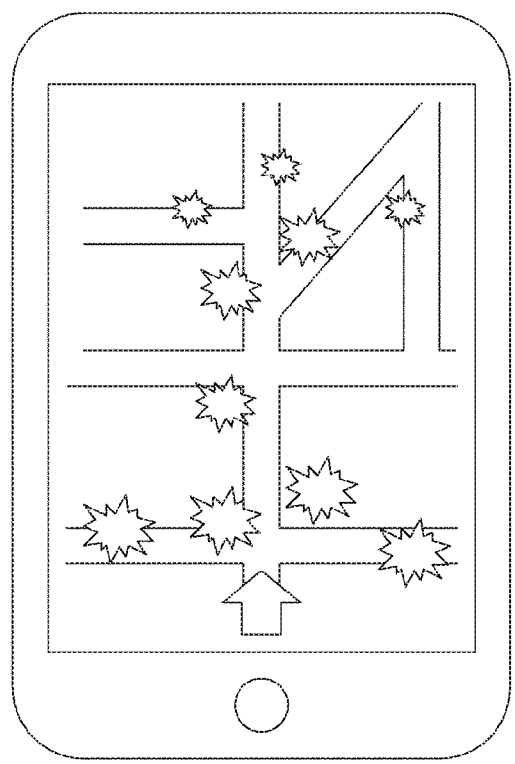
FIGS. 18A and 18B are diagrams that illustrates one example of map display displayed by a display device unit 380 of the mobile terminal 300 in the exemplary embodiment of the present technology.
Figure 18B:
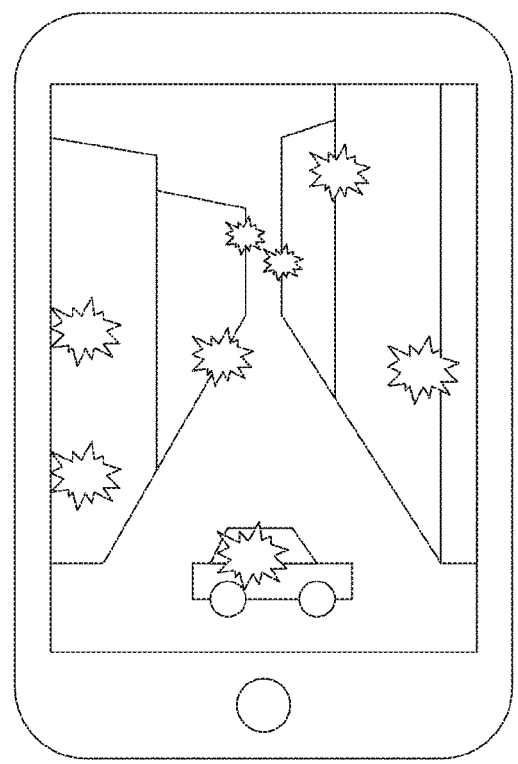

FIGS. 18A and 18B are diagrams that illustrates one example of map display displayed by the display device unit 380 of the mobile terminal 300 in the exemplary embodiment of the present technology.

FIG. 18A is an example in which arrangement positions of IoT devices 100 are arranged on a two-dimensional map. In FIGS. 18A and 18B, an arrow at a bottom of a screen is a current position, and a direction of the arrow shows a current orientation.

Moreover, here, the surrounding IoT devices 100 may be identified with, for example, differently colored icons or different shapes.

Furthermore, only the IoT devices 100 that have types of attributes that a user specifies may be displayed.

Moreover, the nearer to a current position, the larger the displayed IoT devices 100 may become. The more distant from the current position, the smaller the displayed IoT devices 100 may become.

FIG. 18B illustrates an example in which arrangement positions of surrounding IoT devices 100 are superimposed on image information captured by the capture unit 350 of the mobile terminal 300. In FIG. 18B, the arrangement positions of the surrounding IoT devices 100 are virtually and three-dimensionally displayed.

Here, the surrounding IoT devices 100 may also be identified with, for example, differently colored icons or different shapes. Moreover, text information on specific attribute information may also be displayed (not illustrated).

Furthermore, only the IoT devices 100 that have types of attributes that a user specifies may be displayed.

Moreover, the nearer to a current position, the larger the displayed IoT devices 100 may become. The more distant from the current position, the smaller the displayed IoT devices 100 may become.

It is conceivable that the display device unit 380 of the mobile terminal 300 performs display that is visually easily understood, as described above. Furthermore, it is conceivable that such display makes a user want sensed data sensed by the IoT devices 100. In that case, it is conceivable that the user negotiates with a manager who manages the sensed data about the sensed data that is not disclosed. For example, it is conceivable that a business organization that supplies the sensed data through the business-organization server 450 proposes supply of the sensed data to potential customers through such display.

[Vehicular Communication]

Figure 19:
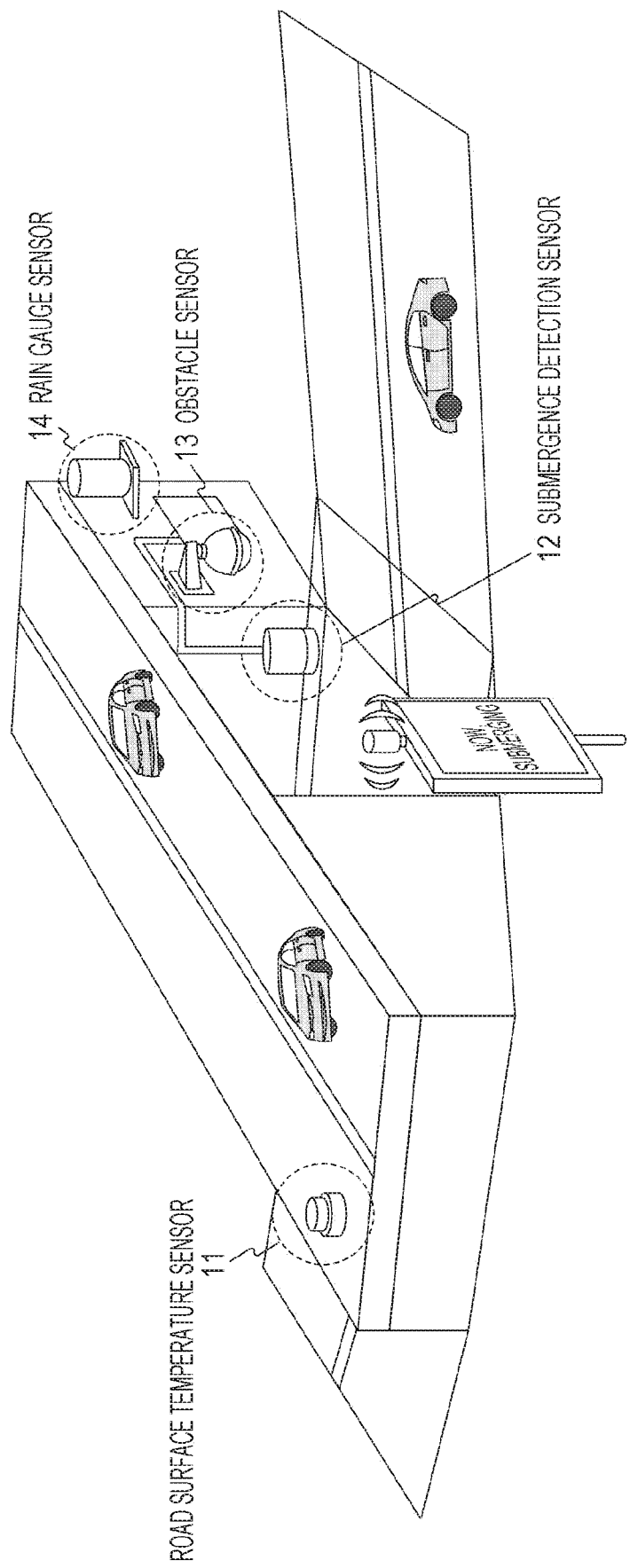
FIG. 19 is a diagram that illustrates an example in which an exemplary embodiment of the present technology is applied to vehicular communication.

FIG. 19 is a diagram that illustrates an example in which the exemplary embodiment of the present technology is applied to vehicular communication.

To provide self-driving in the future, expectation of vehicular communication (vehicle to X (V2X) communication) has increased in recent years. V2X communication is a system in which vehicles and "entities" communicate with each other. Here, examples of the "entities" include vehicles, infrastructures or networks, pedestrians, and the like (V2V, V2I/N, and V2P).

Among the examples, a conceivable use case of the V2I communication is to supply vehicles through wireless communication with various pieces of traffic information necessary for travelling of vehicles, such as speed limits of travelling roadways, congested sections, end points of congestion, broken down vehicles, fallen things, icy-road-surface information, road work section, and the like. In this case, the traffic information may be supplied from roadside units, signal lamps, roadside units, and the like in addition to intelligent transport systems (ITS) spots mainly installed along expressways.

Furthermore, the traffic information may be collected by IoT devices 100 attached on roadside units, signal lamps, road surfaces, and the like. For example, it is conceivable that a vehicle determines a possibility of an icy road surface on the basis of information from an IoT device 100 that includes a road surface temperature sensor 11 arranged on the road surface. Furthermore, it is conceivable that a vehicle determines a possibility of a submerged road surface on the basis of information from an IoT device 100 that includes a submergence detection sensor 12 arranged on a roadside unit. Furthermore, it is conceivable that a vehicle determines a possibility of an obstacle on a road surface on the basis of information from an IoT device 100 that includes an obstacle sensor 13, such as a camera, arranged on a roadside unit.

Also as to the various pieces of traffic information, if sensed data is defenselessly disclosed, there is a possibility that the sensed data is used for applications for which an installer does not intend the sensed data to be used. Furthermore, it is conceivable that an installer installs IoT devices 100 and supplies sensed data only to users. Therefore, it is conceivable that only attribute information that indicates existence of the IoT devices 100 and the types of collected information is disclosed, and only the attribute information is disclosed to a third party.

It is being expected that sensor information will be used in future self-driving, as described above, and thus a vehicle itself will determine safety of a travelling road surface. It is conceivable that grasping the types of IoT devices 100 installed around a road surface and the types of data that are being collected is useful for such autonomous self-driving.

On the basis of attribute information on these IoT devices 100, vehicles determine the types of data that are being collected by IoT devices 100 at a particular position. Therefore, the type of a road is predicted to some degree.

For example, in a case where a plurality of IoT devices 100 that includes road surface temperature sensors 11 is arranged on a road surface, it is predicted that the road surface is likely to be an icy road. Moreover, in a case where a measured value measured by an outside-air temperature sensor attached to a vehicle is low, or in a case where weather information or the like states a possibility of icy road surfaces, it is determined that there is a possibility that the road surface is icy. In that case, it is conceivable that, to perform more detailed determination, the information server 500 is requested to disclose temperature data on the IoT devices 100.

Furthermore, in a case where a plurality of IoT devices 100 that includes submergence detection sensors 12 is arranged on a road surface, it is predicted that the road surface is likely to be submerged. Moreover, in a case where a measured value measured by a rain gauge sensor 14 attached to a vehicle is large, or in a case where weather information or the like states a possibility of submerged road surfaces, it is determined that there is a possibility that the road surface is icy. In that case, it is conceivable that, to perform more detailed determination, the information server 500 is requested to disclose temperature data on the IoT devices 100.

On the other hand, in a case where an area where the number of installed IoT devices 100 is smaller than a predetermined number is detected, it is determined that the area is not sufficiently surveyed, or the road is not appropriate for self-driving. In that case, it is conceivable that a driver is notified of the fact with display on a display or sounds, or a self-driving level is lowered to a level that needs more intervention of a driver.

[Effects]

As described above, in the exemplary embodiment of the present technology, attribute information on IoT devices 100 is accumulated in the information server 500, and is supplied in response to a request of the mobile terminal 300. Therefore, the mobile terminal 300 grasps attribute information on IoT devices 100 arranged around the mobile terminal 300. The user feels less oppressed.

Specifically, a frame used to transmit data from IoT devices 100 includes a disclosable-information field. Only attribute information that indicates existence of the IoT devices 100 and the types of collected information is disclosed. Only the attribute information is disclosed to a third party. To tell existence of the IoT devices 100, only the attribute information that can be disclosed is disclosed. Therefore, users "see" a possibility that information is secretly collected. The users feel more secure.

Furthermore, such disclosure of the attribute information also makes users who do not directly use the sensed data feel secure indirectly. Alternatively, such disclosure of the attribute information calls attention of users who do not directly use the sensed data to warn the users. In this respect, such disclosure of the attribute information may be useful.

Moreover, such disclosure of the attribute information may make users want to obtain the sensed data. Therefore, in a case where a business organization supplies the sensed data that is charged, such disclosure of the attribute information may start receipt of a profit.

Note that the above exemplary embodiment shows one example in which the present technology is embodied. Matters in the exemplary embodiment correspond to matters specifying the invention in the claims, respectively. Similarly, the matters specifying the invention in the claims correspond to matters in the exemplary embodiment of the present technology that have the same names as names of the matters specifying the invention, respectively. However, the exemplary embodiment does not limit the present technology. The present technology may be embodied by variously modifying the exemplary embodiment within the scope of the gist of the present technology.

Furthermore, the process procedures described in the above exemplary embodiment may be considered as a method that includes the series of these procedures. Alternatively, the process procedures described in the above exemplary embodiment may be considered as programs that make a computer perform the series of these procedures. Alternatively, the process procedures described in the above exemplary embodiment may be considered as a storage medium that stores the programs. For example, a compact disc (CD), a MiniDisc (MD), a digital versatile disc (DVD), a memory card, a Blu-ray (registered trademark) disc, or the like may be used as the storage medium.

Note that effects described in the present description are absolutely illustrative and not limitative. Other effects may be.

Note that the present technology may be configured as follows:

(1) A communication terminal including:
  a packet-signal reception unit that receives a packet signal transmitted from a sensing device around the communication terminal;

an attribute-information extraction unit that extracts attribute information on the sensing device from the packet signal; and an attribute-information transmission unit that transmits the attribute information to a server.

(2) The communication terminal according to (1), in which the packet signal includes a public area and a private area, and the public area includes the attribute information.

(3) The communication terminal according to (1) or (2), in which the attribute information includes at least information regarding a type of a sensor of the sensing device.

(4) The communication terminal according to any one of (1) to (3), in which the attribute information includes at least information regarding an arrangement position of the sensing device.

(5) The communication terminal according to any one of (1) to (4), in which the attribute information includes at least information regarding an operation state of the sensing device.

(6) The communication terminal according to any one of (1) to (5), further including a position-information obtaining unit that obtains position information on the communication terminal, in which the attribute-information transmission unit transmits the attribute information to the server on the basis of the position information that has been obtained.

(7) A communication terminal including:

an attribute-information-obtaining request unit that requests a server to obtain attribute information on a sensing device arranged around the communication terminal; and an attribute-information reception unit that receives the attribute information on the sensing device transmitted from the server.

(8) The communication terminal according to (7), further including a movement-destination inference unit that infers a movement destination of the communication terminal, in which the attribute-information-obtaining request unit requests the server to obtain the attribute information on the sensing device arranged around the movement destination that has been inferred.

(9) The communication terminal according to (7) or (8), further including a display unit that displays information regarding the sensing device on a map on the basis of the attribute information received from the server.

(10) A sensing device including:

a measurement unit that measures a surrounding environment and generates a measurement result;

a packet-signal generation unit that generates a packet signal that includes a public area that includes attribute information on the sensing device, and a private area that includes the measurement result; and a packet-signal transmission unit that transmits, at a predetermined period, the packet signal that has been generated.

(11) The sensing device according to (10), in which the packet-signal generation unit encrypts the private area.

(12) A server including:

a storage unit that stores attribute information that includes information regarding an arrangement position of a sensing device;

an obtaining-request reception unit that receives, from a communication terminal, an obtaining request that is requested to obtain the attribute information; and an attribute-information transmission unit that transmits, on the basis of position information on the communication terminal included in the obtaining request, the attribute information on the sensing device arranged around the communication terminal among the attribute information stored in the storage unit.

(13) The server according to (12), further including an attribute-information reception unit that receives the attribute information on the sensing device from the communication terminal, and makes the storage unit store the attribute information.

(14) The server according to (13), further including an arrangement position inference unit that extracts a strength of a received electric field received at the communication terminal from the attribute information received from the communication terminal, infers an arrangement position of the sensing device on the basis of the strength of the received electric field, and makes the storage unit store the attribute information to which the arrangement position that has been inferred is added.

(15) The server according to any one of (12) to (14), further including a measurement-result proposal unit that proposes supply of a result of measurement of a surrounding environment measured by the sensing device, on the basis of the position information on the communication terminal included in the obtaining request.

REFERENCE SIGNS LIST

11 Road surface temperature sensor
12 Submergence detection sensor
13 Obstacle sensor
14 Rain gauge sensor
100 IoT device
101 Antenna
110 Measurement unit
120 Measured-information collection unit
130 Data storage unit
140 Attribute-information storage unit
150 Frame building unit
160 Transmitting-signal processing unit
190 Control unit
200 Positioning satellite
300 Mobile terminal
301 Antenna
311 Received-signal processing unit
312 Attribute-information extraction unit
321 Transmitting-signal processing unit
322 Transmitting-information building unit
331 Positioning-signal reception unit
332 Position information extraction unit
333 Movement detection unit
340 Storage unit
350 Capture unit
360 Operation input unit
370 Displaying-content generation unit
380 Display device unit
390 Control unit
410 Wireless network
420 Base communication station
430 Internet 450 Business-organization server
500 Information server
501 Internet connection unit
511 Received-information processing unit
512 Attribute-information extraction unit
521 Transmitting-information processing unit
522 Transmitting-information building unit
540 Data storage unit
550 Arrangement position inference unit
590 Control unit

The invention claimed is:

1. A communication terminal, comprising:
circuitry configured to:
predict a position of the communication terminal based on a direction of movement of the communication terminal;
sending a request comprising the predicted position to a server to obtain attribute information on a plurality of sensing devices around the predicted position of the communication terminal, wherein the attribute information comprises at least a position of each sensing device of the plurality of sensing devices;
receive the attribute information on the plurality of sensing devices transmitted from the server;
control display of an icon corresponding to each sensing device of the plurality of sensing devices on a map based on the received attribute information;
receive a packet signal transmitted from each sensing device of the plurality of sensing devices around the communication terminal, wherein the packet signal comprises a public area and a private area separated from the public area, the public area is not encrypted and comprises specific attribute information on a respective sensing device of the plurality of sensing devices that generates sensed data, the private area comprises the sensed data of the respective sensing device, and the sensed data is encrypted in the private area;
extract the specific attribute information on the respective sensing device of the plurality of sensing devices from the packet signal, wherein the extracted specific attribute information comprises device information of the respective sensing device of the plurality of sensing devices; and
transmit, to the server, a frame that comprises a plurality of pieces of the device information corresponding to the plurality of sensing devices.

2. The communication terminal according to claim 1, wherein the specific attribute information comprises information regarding a type of a sensor of the respective sensing device of the plurality of sensing devices.

3. The communication terminal according to claim 1, wherein the specific attribute information comprises information regarding an arrangement position of the respective sensing device of the plurality of sensing devices.

4. The communication terminal according to claim 1, wherein the specific attribute information comprises information regarding an operation state of the respective sensing device of the plurality of sensing devices.

5. The communication terminal according to claim 1, wherein the circuitry is further configured to:
obtain position information on the communication terminal; and
transmit the frame to the server based on the obtained position information.

6. A sensing device of a plurality of sensing devices, the sensing device comprising:
a sensor configured to measure a surrounding environment and generate sensed data of the sensor; and
circuitry configured to:
generate a packet signal that includes a public area and a private area separated from the public area, wherein the public area is not encrypted and includes attribute information on the sensing device associated with the sensed data, the private area includes the sensed data of the sensor, and the sensed data is encrypted in the private area; and
transmit, at a determined period, the packet signal to a communication terminal, wherein the communication terminal predicts a position of the communication terminal based on a direction of movement of the communication terminal, sends a request comprising the predicted position to a server to obtain specific attribute information on the plurality of sensing devices around the predicted position of the communication terminal, receives the specific attribute information on the plurality of sensing devices transmitted from the server, and controls display of an icon corresponding to each sensing device of the plurality of sensing devices on a map based on the received specific attribute information, wherein the specific attribute information includes at least a position of each sensing device of the plurality of sensing devices.

7. A server, comprising:
circuitry configured to:
store attribute information on a plurality of sensing devices in a memory, wherein the attribute information comprises information regarding an arrangement position of the plurality of sensing devices and the attribute information is received in a packet signal transmitted from each sensing device of the plurality of sensing devices around a communication terminal, wherein the packet signal comprises a public area and a private area separated from the public area, the public area is not encrypted and comprises the attribute information on the plurality of sensing devices that generate sensed data, the private area comprises the sensed data of the plurality of sensing devices, and the sensed data is encrypted in the private area;
receive, from the communication terminal, an obtaining request that is requested to obtain the attribute information, wherein the obtaining request comprises a predicted position of the communication terminal based on a direction of movement of the communication terminal; and
transmit, based on the predicted position of the communication terminal in the obtaining request, a frame that comprises information on surrounding sensing devices around the predicted position of the communication terminal among the plurality of sensing devices, and specific attribute information on the surrounding sensing devices among the attribute information stored in the memory, wherein the specific attribute information comprises at least a position of each of the surrounding sensing devices.

8. The server according to claim 7, wherein the circuitry is further configured to receive the attribute information on at least one sensing device of the plurality of sensing devices from the communication terminal.

9. The server according to claim 8, wherein the circuitry is further configured to:
extract a strength of an electric field received at the communication terminal from the attribute information received from the communication terminal; and infer the arrangement position of the at least one sensing device based on the strength of the electric field.

10. The server according to claim 7, wherein the circuitry is further configured to propose supply of a result of measurement of a surrounding environment measured by the plurality of sensing devices, based on position information on the communication terminal.

\* \* \* \* \*